(12) United States Patent
Miller et al.

(10) Patent No.: US 11,146,381 B2
(45) Date of Patent: Oct. 12, 2021

(54) TRACEABILITY OF EDITS TO DIGITAL DOCUMENTS VIA DISTRIBUTED LEDGERS

(71) Applicant: ADOBE INC., San Jose, CA (US)

(72) Inventors: Gavin Stuart Peter Miller, Los Altos, CA (US); Xuejun Xu, Cupertino, CA (US); Max Gray Edell, Ottawa (CA); John Bevil Bates, Highland, UT (US); Matthew Keith Albright, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 263 days.

(21) Appl. No.: 16/193,773

(22) Filed: Nov. 16, 2018

(65) Prior Publication Data

US 2020/0162236 A1  May 21, 2020

(51) Int. Cl.
| | |
|---|---|
| *H04L 9/06* | (2006.01) |
| *H04L 9/32* | (2006.01) |
| *G06F 16/27* | (2019.01) |
| *G06F 16/93* | (2019.01) |
| *G06F 16/23* | (2019.01) |
| *G06F 40/174* | (2020.01) |

(52) U.S. Cl.
CPC ........ *H04L 9/0637* (2013.01); *G06F 16/2365* (2019.01); *G06F 16/2379* (2019.01); *G06F 16/27* (2019.01); *G06F 16/93* (2019.01); *G06F 40/174* (2020.01); *H04L 9/0643* (2013.01); *H04L 9/3247* (2013.01); *H04L 2209/38* (2013.01)

(58) Field of Classification Search
CPC ... H04L 9/0637; H04L 9/0643; H04L 9/3247; H04L 2209/38; H04L 63/00; H04L 9/3239; H04L 63/123; G06F 40/174; G06F 16/27; G06F 16/93; G06F 16/2365; G06F 16/2379; G06F 16/9024; G06F 40/197

See application file for complete search history.

(56) References Cited

U.S. PATENT DOCUMENTS

2018/0091524 A1* 3/2018 Setty .................... H04L 9/0643
2018/0302417 A1* 10/2018 Wilson ................... G06F 16/24
(Continued)

FOREIGN PATENT DOCUMENTS

WO  WO 2019/108167 A1 * 6/2019 ............. H04N 5/913

*Primary Examiner* — Christopher A Revak

(74) *Attorney, Agent, or Firm* — Shook, Hardy & Bacon L.L.P.

(57) ABSTRACT

Embodiments provide traceability of edits to a document, i.e., a verifiable and immutable provenance chain for the document. Systems and methods enable traceability of edits, by encoding, for states of the document, a fingerprint (e.g., a cryptographic hash of the document's contents) and an edit history within a block written to a distributed ledger (e.g., a blockchain). The ledger is maintained via a self-organizing peer-to-peer distributed ledger network. Once added to the ledger, the contents of a block (e.g., the document's fingerprint and edit history) are immutable and the integrity of the edit history encoded in the ledger is secure. The algorithm that generates the fingerprint is sensitive to edits of the document. The non-corruptible fingerprint encoded in the ledger is employable to detect any edits that are not included in the encoded edit history and/or inconsistent with a currently available version of the document.

20 Claims, 8 Drawing Sheets

(56) References Cited

U.S. PATENT DOCUMENTS

| | | | |
|---|---|---|---|
| 2019/0013934 A1* | 1/2019 | Mercuri | H04L 9/3265 |
| 2019/0123889 A1* | 4/2019 | Schmidt-Karaca | H04L 9/3239 |
| 2020/0210519 A1* | 7/2020 | Wang | H04L 9/0618 |
| 2021/0021426 A1* | 1/2021 | Scherrer | H04L 9/3242 |
| 2021/0149885 A1* | 5/2021 | Li | G06F 16/2379 |

* cited by examiner

TRACEABILITY OF EDITS TO DIGITAL DOCUMENTS VIA DISTRIBUTED LEDGERS

BACKGROUND

Technologies that enable difficult-to-detect alterations of digital assets (e.g., visual images, audio/video recordings, records of economic transactions, legal contracts, and such) are advancing. For example, conventional image editing applications enable editing of a digital image that modifies the visual appearance of a subject depicted within the image. The apparent body size and/or shape of a model depicted within an image may be altered and/or re-touched. Without examining an unmodified copy of the image, an observer of the edited image may be unable to visually perceive such alterations. Due to increasing concerns over body dysmorphic disorder issues correlated with the unrealistic portrayals of models in advertising, as well as other concerns, legislators in some jurisdictions have statutorily compelled the disclosure of some types of image alterations, particularly when used in advertising. The sophistication of these image editing applications make enforcement of such statutes difficult, at least because verifying that particular visual aspects of a digital image have not been altered is challenging.

In another example, scientists and engineers have developed deep learning methods that enable the alteration of an audio recording of a speaker, such that in the altered audio recording, the person appears to be speaking statements that were never uttered. The non-detectability of altering, within a digital document, an individual's visual appearance or speech (e.g., via "deepfake" machine learning technologies) gives rise to numerous concerns, including but not limited to issues related to deceptive advertising, copyright infringement, and fraud, among other things.

SUMMARY

Embodiments of the present invention relate to providing traceability of edits and/or alterations to a digital document, such as but not limited to digital images, audio/video recordings, records of economic transactions, and legal documents. More specifically, systems and methods are disclosed that provide traceability of edits, alterations, authorship, or even access to digital documents so that such edits can be tracked and audited in real-time. In various embodiments, altered states of a document can be automatically determined and stored onto a distributed ledger. In other words, each time a document is accessed, modified, and/or saved, among other things that could change a document or metadata associated therewith, a fingerprint indicating the state of the document (e.g., a cryptographic hash of at least a portion of the document's contents) and/or an edit history of the document can be generated and stored within a block (or record) written to a distributed ledger, such as a blockchain.

In operation, the altered document's fingerprint and/or edit history can be stored to reference a previously stored fingerprint and/or edit history of the document. In other words, a recorded change to a document state can reference a prior state of the document (i.e., the state of the document on which the change was made). As the document is shared among various authors or editors, and different modifications are made to different versions of the document, the fingerprints and/or edit histories of each document version can be stored in reference to previous document versions on which the various modifications were made. In this way, every detail related to the provenance of a particular document can be audited from its time of creation via the decentralized ledger. The decentralized and immutable nature of the distributed ledger, and the auditable provenance trail of the document, can provide assurances that any particular copy and/or version of the document has either maintained its original state, or has been modified within acceptable boundaries, among other things.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
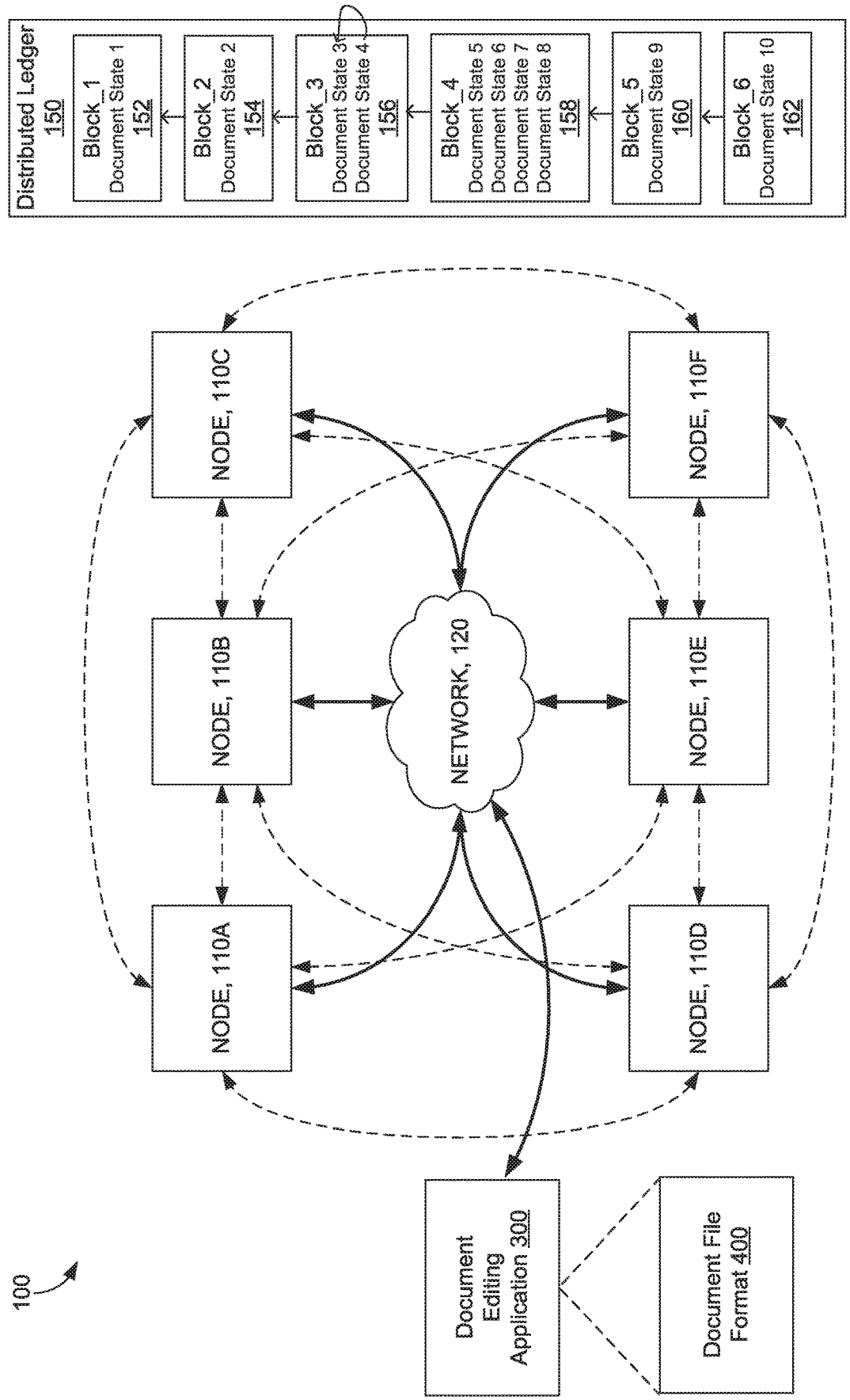
FIG. 1 is an exemplary system diagram of a distributed ledger network in accordance with some embodiments of the present invention.

The detectability of edits and/or alterations to digital documents or assets (e.g., digital images, audio/video recordings, records of economic transactions, and legal contracts) is important for various reasons, including but not limited to personal, reputational, health/wellness, economic, and legal concerns. The continued advancement of document editing technologies is rendering the detection of alterations difficult, or even impossible, via conventional techniques. For example, image editing applications now enable alterations to the appearance of subjects depicted within an image, such that an observer of the altered image cannot visually detect that the appearance of a depicted subject was altered without a direct comparison to a copy of the unaltered image. In particular, conventional analysis via image processing techniques may not be able to detect such alterations performed via image editing techniques. Further, developments in technologies that enable non-detectable alterations of audio/video recordings, as well as documents of economic transactions and legal agreements, are similarly advancing. As such, tracking the edit history and verifying the provenance of digital documents or assets in various technologies (e.g., images, audio/video recordings, economic transaction documents, legal agreements, etc.) is a growing concern.

However, conventional methods that attempt to verify the provenance of digital documents do not provide the confidence required to address these growing concerns. Many such conventional methods are centralized, which necessitates a trust in a centralizing agent or party. Some users may not have the required trust in any one specific centralizing agent. Furthermore, even if trust is placed in the centralizing agent, a document's edit history, which is tracked via conventional methods, may be subject to retroactive edits or alterations. That is, similar to the document, the edit history itself may be subject to conventionally non-detectable edits and/or alterations. Thus, the reliability and/or accuracy of any such conventionally tracked edit history may be degraded and/or corrupted.

As such, the various embodiments herein are directed towards providing an enhanced auditing system that provides an auditable provenance (e.g., a trail or record) of a digital document and/or a digital asset via distributed ledgers. That is, the various embodiments are directed towards providing traceability of any edits and/or alterations made to a digital document or asset, such as but not limited to digital images, digital audio/video recordings, digital records of transactions, electronic documents (e.g., PDF files, Word documents, text files), digital files (e.g., compressed documents, executable files, libraries, code files), and digital legal documents. Advantageously, as discussed throughout, the edit history of a document, tracked via the various embodiments, is practically non-corruptible and immutable. That is, once an edit is memorialized (e.g., entered) into the tracked edit history, the record of the edit within the edit history is not subject to undetectable retroactive edits and/or alterations. Thus, in contrast to conventional methods, an accurate, precise, and verifiable edit history of a digital document or asset may be provided to a user. Furthermore, and also in contrast to conventional methods, the tracking of the edit history is decentralized, and trust in a single centralizing agent is not required.

At a high level, various embodiments described herein generally relate to the encoding of digital fingerprints and edit histories for a document, among other things, into an immutable distributed ledger. More specifically, whenever a document is modified, the digital fingerprint of the modified document and a history of edits associated with the modification(s) can be determined and stored onto a distributed ledger. The stored digital fingerprint of the modified version of the document and the history of edits associated with the modification(s) can also be linked to (e.g., reference) a previously determined and stored digital fingerprint of a version of the document saved just prior to the modification, and any history of edits associated with the document version saved just prior to the modification. In this way, an audit trail for a document, regardless of when and where modifications to the document are made, who makes the modifications, and which versions of the document is modified, can be generated and stored onto a distributed ledger that is trusted, immutable, and available to determine the document history.

In particular, embodiments of the present invention provide traceability of alterations and/or edits to digital documents, by storing, for each state of the document, a fingerprint of the document's state (e.g., a cryptographic hash of at least a portion of the document's contents) in a block (or record) within a distributed (i.e., non-centralized) ledger, such as a blockchain. The distributed ledger may be maintained via a distributed ledger network. The algorithm that generates the fingerprint of the document is sensitive to edits and/or alterations of the document. For example, a cryptographic hashing algorithm that exhibits an avalanche effect when the contents of the document are altered may be employed to generate the document's fingerprint for each state of the document. Thus, when the fingerprint of a first state and a second state of the document are compared, a difference between the fingerprint of the first state and the fingerprint of the second state indicates at least an edit and/or alteration of the document.

The blocks of the distributed ledger may be cryptographically linked to ensure that the blocks (and thus the document-state fingerprints encoded in the blocks) are not retroactively alterable and/or corruptible upon being added to the ledger. Adding a block to the ledger requires a decentralized consensus amongst nodes storing the ledger. The decentralized consensus effectively verifies the cryptographic link to (and the un-corruptible and/or immutable integrity of the document-state fingerprints encoded in) the previous blocks. Thus, due to the decentralized nature of the ledger and the cryptographic links between the blocks, edits to the document are detectable (and thus traceable) via the document fingerprints encoded in the blocks. Accordingly, an edit history of the digital document is practically unalterable and verifiable, providing complete traceability of any and all edits and/or alterations made to the digital document. Because the ledger provides a provenance of the digital document or asset, the unalterable distributed ledger may be a blockchain-like provenance chain.

In various embodiments, implementations of the distributed ledger may be at least similar to a blockchain, and thus, once recorded into blocks of the distributed ledger, the contents of the ledger (i.e., the fingerprints of the various states of the documents) are practically unalterable, immutable, and/or incorruptible. Thus, the distributed ledger may be referred to throughout as a blockchain, though other forms of distributed ledgers known to those of ordinary skill remain within the purview of the present disclosure. The ledger may be additionally referred to as an immutable and/or non-corruptible database.

In implementation, a digital document, such as but not limited to a digital image, for which to provide traceability of an edit history is obtained or generated. For example, a camera may capture image data encoding the digital image. Upon obtaining the digital image (or other digital document or asset), a fingerprint (e.g., a cryptographic hash and/or hash value) of a first (e.g., an initial) state of the document is generated and added as a first block to a distributed ledger encoding the first state fingerprint of the document. In accordance with detecting a transition to a second state of the document (e.g., detecting a file operation, such as but not limited to editing, saving, re-saving, coping, and/or moving the document), a fingerprint of the second state of the document is generated. A second block, encoding the second state fingerprint of the document, can then be added to the distributed ledger, via a distributed consensus of nodes storing the ledger. In addition to a fingerprint of the second state of the document, the second block may include at least a fingerprint (e.g., a cryptographic hash) of at least a portion of the contents of the previous block in the chain (e.g., the first block), as well as a reference link back to the previous block. Because the contents of the previous block include a fingerprint of the document's previous state, the added block may include a fingerprint of a fingerprint, e.g., a hash value of a hash value. Throughout the document's history or lifetime, each state of the document may be detected and recorded in the ledger via the addition of new blocks to the ledger. Thus, the fingerprints of each state (and thus indications of any edits to the contents) of the document are cryptographically linked in a chain (e.g., a blockchain).

As noted above, the second block can include the second state fingerprint of the document, a cryptographic hash of the contents of the first block (i.e., a hash value of the first state fingerprint of the document), and a reference link back to the first block. From the second block, the integrity of the contents of the first block may be verified via the reference link to the first block and the hash value of the contents of the first block. For example, the contents of the first block may be retrieved via the reference link and hashed via the same hashing algorithm originally employed to generate the hash value (of the contents of the first block) stored in the second block. A comparison of this hash value to the hash value stored in the second block may verify that the contents of the first block are unaltered and not corrupted. Thus, once a state fingerprint of the document has be entered into the ledger, any alterations to the fingerprint are detectable, and thus the fingerprint of the document is essentially unalterable, immutable, and/or non-corruptible. Due to the avalanche effect the algorithm employed to generate the state fingerprints of the document, a comparison between the first state fingerprint of the document and the second state fingerprint of the document may be employed to detect any edits or alterations made to the document between the first state of the document and the second state of the document. The integrity of each block may be similarly verified via traversing the chain of blocks in the ledger. Accordingly, any edits and/or alterations to the document are traceable via a traversal of the chain of unalterable blocks.

That is, in contrast to conventional methods, the edit history of any digital document is practically unalterable, and thus verifiably traceable. In further contrast to conventional methods, due to the distributed nature of the ledger, trust in a centralizing agent is not required. In various embodiments, for each state of the document, a copy of the document may be stored in a document repository. In each block added to the ledger, a reference link to the corresponding copy of the document in the document repository may be included. Thus, each state of the document may be recalled and/or retrieved via the reference link (to the repository copy of the document) included in the corresponding block. To verify the integrity of the repository copy of the document, a state fingerprint of the retrieved copy of the repository copy may be generated (via the same avalanche effect-prone algorithm that initially generated the state's fingerprint) and compared to the state fingerprint stored in the corresponding block. Thus, the integrity of copies for each state of the document stored in the document repository are reliable, immutable, and non-corruptible. The document repository may be a cloud-based document repository. The document repository may be a document storage repository and/or a document archiving repository. The document repository may be a document managing system, where documents may be "checked in" and "checked out" by users based on user permissions.

The discussions of some of the various embodiments are directed towards providing traceability of an edit history of a digital document that is a digital image. However, it should be understood that the embodiments are not so limited, and the embodiments may also include providing traceability of an edit history of other types or classes of digital documents and assets, such as but not limited to audio/video recordings, records of transactions, and legal documents. Other embodiments may be directed towards providing the traceability of various textual documents (e.g., word processing documents, books, articles, memos, journals, and blogs), spreadsheet documents, slide-deck documents, technical drawing documents, source code for applications, and various works of art and/or entertainment encoded in digital documents.

As used herein, a transition between states of a document may occur whenever the document is saved, copied, moved, "checked in" or "checked out" to a document management system or document repository, updated, or any other such file-oriented operations. Thus, a transition between a first document state and a second document state may be detected when a file encoding the document is saved, re-saved, moved, copied, or the like. In at least some embodiments, a transition in the state of the document may occur when one or more edits, alterations, or updates are provided to the document. As noted above, at least a fingerprint (e.g., a cryptographic hash) of each document state may be recorded into the distributed ledger. Thus, any time a transition between states of the document is detected, the ledger may be updated. For example, for each save or copy operation performed on a document, the ledger may be updated to include the fingerprint of the document's current state. Note that information relating to the contents of the document may be identical in a first and a second state, i.e., the document's contents have not been edited or altered between the first and second states of the document.

As used herein, the term "fingerprint" of a document or the state of the document may refer to a value that is determined and/or generated based on at least a portion of the document's contents. In some, but not necessarily all of the embodiments herein, the value encoded in the fingerprint includes significantly less information than the information encoded in the document's contents. Thus, the fingerprint (or fingerprint value) may be generated based on a fingerprinting algorithm (or fingerprinting function), which maps the document's contents (e.g., a first bit string) onto a fingerprint value (e.g., a second bit string), where the first bit string is significantly longer than the second bit string. In some, but not all embodiments, an inverse function of the fingerprinting function is significantly difficult to determine and/or construct. That is, the only feasible method to determine the first bit string from the second bit string would be a brute force search, employing the fingerprinting algorithm, over the domain of possible first bit strings. Thus, the fingerprinting function may be a cryptographic fingerprinting function. The fingerprinting function may be a non-invertible one-to-one mapping function from the first bit string to the second bit string. However, in other embodiments, the mapping may not be strictly unique or one-to-one. For instance, in some embodiments, the fingerprinting function may exhibit avalanche effects (e.g., significant sensitivities to variations in the first bit string), such that the likelihood of a "collision" between small variations in the document's contents is sufficiently mitigated. Thus, in various embodiments, the function employed to generate a fingerprint may include, or at least be similar to, a cryptographic hash function. However, other embodiments are not so limited and other fingerprinting algorithms, such as but not limited to Rabin's-type fingerprinting algorithm may be employed.

In various embodiments, the fingerprint of a document, may be referred to as the document's "signature." A fingerprint may also be referred herein as a "message digest," or simply a "digest" of the message. The document's content (or portions thereof) may serve as the "message." Thus, as used herein, a "message" may refer to any data encoding information, such as but not limited to the contents of a document. Thus, a fingerprinting function maps the message (e.g., the first data string discussed above) to the message digest (e.g., the second data string discussed above). As such, the fingerprint serves as a digest of the message (e.g., at least a portion of the document's contents). In various embodiments, a fingerprinting function or algorithm is deterministic, infeasible to invert, the message digest is significantly sensitive small variations in the message (i.e., exhibits avalanche effects), and is unlikely to generate the same message digest for separate messages. In at least one embodiment, a fingerprinting function may be the identity function for the contents of the document. That is, a fingerprint of a document may be identical to at least portions of the document.

In some embodiments, the fingerprint of the document may be generated via a tamper resistant image hashing function or algorithm, such as but not limited to a perceptual hashing function, or "p-hash" of the document's contents. A tamper resistant image hashing function, such as a perceptual hash, may include a hashing algorithm or hash function that is relatively insensitive to certain types of edits or updates to particular features of a document, while being significantly sensitive to other types of edits or alterations to the features of the document. For example, in embodiments where the document is a digital image, a p-hash value of at least a portion of the image (e.g., a portion that includes a visualization of a subject, such as a model) may be generated. In some embodiments, the image may be semantically segmented to identify portions of the image associated with various subjects depicted in the image (e.g., a model and a background). Based on the semantic segmentation of the image, a p-hash algorithm may be employed to generate a p-hash value of the semantically identified portion of the image depicting the model. The p-hash value may be employed as the fingerprint of the image for the current state of the image.

The p-hash algorithm employed to generate the p-hash value of the portion of the image depicting the model may be relatively insensitive to certain classes or types of edits to the model, such as rotations or proportional re-scaling of the size and/or shape of the model. However, the p-hash algorithm may be significantly sensitive to other types of edits to the model, such as non-proportional re-scaling or the enhancement or decrease in the size or shape of portions of the model's figure. That is, the p-hash algorithm may include an avalanche effect for such types or classes of edits to be tracked. In various embodiments, a separate type of hash algorithm may be employed for each of the semantically segmented and/or otherwise identified portions of the image. For example, a first p-hash algorithm may be targeted towards portions of the image that depict human subjects, and a second p-hash algorithm (or any other type of fingerprint generator) may be targeted towards portions of the image that depict non-human subjects. That is, a fingerprint may be separately generated (and included in the distributed ledger) for each semantically segmented portion of the image. In this way, the embodiments may provide traceability for specific types of edits or alterations (e.g., manipulations of the shape of a subject depicted in the image) and for specific subjects depicted with the image, while not tracking other types of alterations and/or particular subjects (e.g., manipulations of the color of the background of the image).

Exemplary Embodiment of a Distributed Ledger Network to Facilitate Edit Traceability Turning now to FIG. 1, a schematic depiction is provided illustrating an exemplary distributed ledger network 100, which may be employed in the various embodiments to provide traceability for edits and/or alterations to a digital document and/or asset. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The distributed ledger network 100 depicted in FIG. 1 includes a plurality of nodes 110A-110F that are each in communication with one or more nodes 110A-110F over a network, such as the Internet. In accordance with the present disclosure, each node 110A-110F is a node of a distributed ledger network 100, as later described in accordance with FIG. 3, which is also a computing device later described in accordance with FIG. 8. As noted throughout, various features of the distributed ledger 150 may be equivalent to, or at least similar to the features of a blockchain. Accordingly, throughout, the distributed ledger 150 may be referred to as a blockchain, or a blockchain-like ledger. In some embodiments, and preferably for public blockchain implementations, each node 110A-110F in the distributed ledger network 100 can operate as a peer to every other node 110A-110F of the distributed ledger network 110 such that no single node 110A-110F is more influential or powerful than any other node 110A-110F.

In the various embodiments herein, the blocks of the distributed ledger 150 may encode each state of a document. By encoding the states of a document in distributed ledger 150, traceability of edits and/or alterations to the document may be provided. Briefly, each state transition of a document may generate a transaction. The generated transaction may be encoded in a block. As discussed below, the block encoding the transaction may be added to the distributed ledger 150 via a distributed consensus of nodes 110A-110F. A document editing application, such as document editing application 300, may generate a state transition on a document (e.g., a file operation and/or one or more edits on a document). Various embodiments of document editing application 300 are discussed in conjunction with at least FIG. 3. In some embodiments, document editing application may be similar to document editing application 260 of FIG. 2. The document may be stored in an enhanced document file format, such as but not limited to document file format 400. In some embodiments, document editing application 300 may provide one or more of the functionalities of a node, such as but not limited to nodes 110A-110F. Various embodiments of an enhanced document file format are discussed at least in conjunction with FIG. 4.

As shown in FIG. 1, distributed ledger 150 includes six blocks: block_1 152, block_2 154, block_3 156, bloakc_4 158, block_5 160, and block_6 162. Other embodiments of distributed ledgers may include more or less blocks. As discussed throughout, each of the blocks encodes one or more states of the document. Encoding a state of a document may include encoding at least one of a fingerprint of the document's state and/or an edit history of the document associated with the document's state. As a non-limiting example, block_1 152 encodes document state 1, block_2

154 encodes document state 2, and block_3 156 encodes both document state 3 and document state 4. The other blocks are shown to encode additional states of the document. Each block can include a reference or a link to a previous block. Also shown in block_3 156, an encoding a document's state may include a reference or link to a previous encoding of the document's state (e.g., the encoding of document state 4 includes a reference and/or a link to the encoding of document state 3). The links may be across blocks and/or within the same block.

As used herein, the term "transaction" may refer to any machine-related event that includes at least one of detecting, for a digital document or asset, a transition from a first state (e.g., a previous state) of the document to a second state (e.g., a current state) of the document, generating a fingerprint for the current state of the document, updating any information (such as updating the edit history) included in an enhanced file format for the document, generating one or more blocks that include information associated with the transition of document states, such as but not limited to the document's updated edit history and the document's current state fingerprint, and/or adding such a block to the distributed ledger 150, via a distributed consensus of the block, as well as validating/verifying the contents of any such block that has been added to the ledger.

As noted above, operations performed by nodes can include, among other things, validating transactions, verifying blocks of transactions, and adding records to an immutable database (i.e., the distributed ledger 150) that is collectively maintained by the nodes 110A-110F. It is contemplated, however, that in some embodiments, a particular subset of the nodes 110A-110F can be specifically designated for performing a subset of or all node operations described herein. In this regard, as opposed to embodiments where each node is a peer with other nodes, some embodiments can employ specially-"designated nodes" (preferably for private blockchains or ecosystems where centralization is not a concern) that perform a subset of or all of the described node operations.

In accordance with embodiments described herein, the immutable and/or non-corruptible database collectively maintained by the nodes 110A-110F is referenced herein as a blockchain 150 and/or a distributed ledger 150. The blockchain 150 maintained by the distributed ledger 150 network 100 includes a plurality of records that is immutable by virtue of the distributed nature of the distributed ledger network 100, applied cryptography concepts, and a consensus module (not shown) that is independently included and operated by any number of nodes 110A-110F. While any node can generate a transaction that is encoded in a block (or record) to be added to the blockchain 150, the consensus module requires that the block (or record) be added to the blockchain 150 only based on a determination that a consensus (e.g., greater than 50%) of the nodes 110A-110F (or designated nodes) has collectively validated the transaction. In this regard, while each node 110A-110F can independently store a copy of the blockchain 150, a block or record can only be added to the blockchain 150 when a consensus to add the record has been reached by the nodes 110A-110F (or designated nodes) of the distributed ledger network 100. Due to the decentralized nature of nodes 110A-110F, adding a block or record to the blockchain 150 in this manner may be referred to as adding the block via a decentralized consensus.

In the various embodiments, a transaction may be generated when a document is transitioned from one state to another, such as but not limited to when the document is saved, copied, and/or edited, as well as various other file operations are performed. The generation of such a transaction may include generating a fingerprint of the current state of the document and updating an edit history of the document, as well as updating any other information associated with the current state of the document that is to be tracked. At least the fingerprint and/or the updated edit history may be included in a block (or record) to add to the blockchain 150. To add the corresponding block to the blockchain 150, the corresponding transaction must be verified via a distributed consensus of the nodes 110A-110F. That is, nodes 110A-110F must determine, via a consensus, that the transaction is valid, i.e., at least the document's fingerprint has been correctly generated and the updated edit history accurately reflects the edits to the document. That is, determining the transaction to be valid may include at least one of determining that the updated edit history accurately reflects any edits and/or alterations to the document and/or that the fingerprint of the current state of the document has been generated properly.

If a node (or designated node) in the distributed ledger network 100 determines that one or more of the foregoing conditions is not satisfied, the transaction may be determined invalid by the node and the transaction is not passed on (e.g., communicated) to other nodes (or designated nodes) to which it is connected. On the other hand, if the node (or designated node) determines that both of the foregoing conditions are satisfied, the transaction is determined valid and the node passes on (e.g., communicates) the transaction, along with an indication that the node independently validated the transaction, to other nodes 110A-110F (or designated nodes) to which it is connected. As the nodes 110A-110F in the distributed ledger network 100 are all directly or indirectly connected to one another, this validation process continues until the nodes (or designated nodes) collectively determine that a majority (i.e., consensus) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity. This type of verification of the validating of a transaction may be referred to as a distributed consensus. As discussed throughout, upon a distributed consensus of validity of a transaction, a corresponding block may be added to the distributed ledger 150.

As noted throughout, in some embodiments, various incentives may be provided to a user, such that the user provides at least a portion of resources associated with a computing device to enable and/or provide services to implement one or more nodes of noes 110A-110F. Such incentives may be provided by a transaction that includes transfer of ownership of a unit of value, such as but not limited to a digital token, virtual coin, and/or a crypto coin. Asymmetric key cryptography (e.g., private-public key pairs) may be employed to secure and generate a transaction that involves the transfer of such an incentivizing unit of value and/or token.

More particularly, validation of a transaction, which involves the transfer of a unit of value and/or the transfer of ownership of a document, may be facilitated utilizing features of asymmetric key cryptography (i.e., public-private key pairs), among other things. In some aspects, as is commonly known in public blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital fingerprint generated by an associated private key. As public keys can be shared freely, public keys generally function as "wallet addresses" that are associated with a private key. In this regard, digital tokens or other units of value (e.g., a virtual coin) can be "transmitted" from one wallet address (i.e., a public key of a sender) to another wallet address (i.e., a public key of a receiver). In actuality, however, the transmission of a digital token or unit of virtual value is not a physical transfer, but is represented as a record of transfer from one wallet address to another that, if validated, is recorded onto the blockchain 150. The record is not finalized (i.e., added to the blockchain 150), however, until the transfer is validated by a distributed consensus of the nodes 110A-110F in the distributed ledger network 100, as described above.

To generate a transaction to transfer a digital token(s), ownership of a digital asset, or other such transaction, the owner of the sending wallet address must digitally sign the transaction with the private key associated with the sending wallet address. Nodes 110A-110F (or designated nodes) of the distributed ledger network 100 must independently determine that the transaction from the sending wallet address is valid by digitally authenticating the digital fingerprint with the sending wallet address (i.e., the public key). The nodes 110A-110F (or designated nodes) must also independently determine, by referencing their independently-stored copy of the blockchain 150, that the sending wallet address is in fact associated with the digital token being transferred, or that the sending wallet address has sufficient liquidity (i.e., has a calculated aggregate value based on associated records in a local copy of the blockchain 150) to transfer the unit(s) of value. If a node (or designated node) in the distributed ledger network 100 determines that either of the foregoing conditions is not satisfied, the transaction is determined invalid by the node and the transaction is not passed on (e.g., communicated) to other nodes (or designated nodes) to which it is connected. On the other hand, if the node (or designated node) determines that both of the foregoing conditions are satisfied, the transaction is determined valid and the node passes on (e.g., communicates) the transaction, along with an indication that the node independently validated the transaction, to other nodes 110A-110F (or designated nodes) to which it is connected. As the nodes 110A-110F in the distributed ledger network 100 are all directly or indirectly connected to one another, this validation process continues until the nodes (or designated nodes) collectively determine that a majority (i.e., consensus) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity. It should be understood that such asymmetric key cryptography mechanisms may be employed in the various embodiments to transfer other digital assets, such as but not limited to the ownership of a document, read/write/access permissions of the document, and the like. It should also be understood that such asymmetric key cryptography mechanisms may be employed to validate other sorts of transactions included in the various embodiments, such as but not limited to detecting a transition from a previous state of a document to a current state of the document, generating a fingerprint for the current state of the document, updating any information (such as updating the edit history) included in a file format for the document, generating one or more blocks that include information associated with the transition of document states, such as but not limited to the document's updated edit history and the document's current state fingerprint, and/or adding such a block to the distributed ledger 150.

After a consensus of validity for a transaction has been reached by the nodes 110A-110F (or designated nodes), the transaction awaits confirmation (i.e., addition to the blockchain 150). As the nodes 110A-110F (or designated nodes) can be peers with each other, any node (or designated node) can participate in the process of adding the transaction to the blockchain 150. For purposes of background, the blockchain 150 includes records of validated transactions that are grouped into a cryptographically chained series of blocks, whereby each block includes a subset of these records. Any node 110A-110F (or designated node) can perform the process of block generation, which can be implemented in a variety of ways based on a consensus algorithm implemented within its consensus module including, but not limited to, proof of work, proof of stake, proof of authority, practical *Byzantine* Fault Tolerance, or Federated *Byzantine* Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain 150, the transaction must first be included into a block that is being generated by one of the nodes 110A-110F (or designated nodes) and subsequently validated by a consensus of the nodes (or designated nodes) in the distributed ledger network 100. The transaction can be independently included into a block, or grouped together with other transactions, either of which are included within the purview of the present disclosure. Such implementations may vary, however, based on consensus module design and/or a block size (i.e., memory limitation) implemented or defined within the consensus module operated by the nodes 110A-110F (or designated nodes). The node generating the block must also include, into the block it is generating, a fingerprint (e.g., a cryptographic hash) of the block most-recently added to the blockchain 150. Once generated in accordance with consensus rules defined within the consensus module, the node generating the block can send the generated block to the nodes (or designated nodes) to which it is connected.

The nodes (or designated nodes) receiving the generated block can then verify that the block includes one or more valid transactions, includes a proper fingerprint (e.g., a hash value) of the block most-recently added to the blockchain 150, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 100, the generated block including at least the transaction can be verified by another determined consensus of the nodes (or designated nodes). When a determination is made by a consensus of the nodes 110A-110F (or designated nodes) that a block is verified, the newly-verified block is added to the blockchain 150 immediately subsequent to the previously-added block, the fingerprint of the previously-added block being included in the newly-verified block. As such, each block is cryptographically "chained" to a previous block and a subsequent block. In other words, the cryptographic fingerprints or hashes of the previous blocks, facilitate maintenance of the order and accuracy of records included in the blockchain 150.

In some instances, if the same transaction is included into a block generated by different nodes (or designated nodes) and validated throughout the network within a substantially similar timeframe, the blocks can be temporarily confirmed leading up to a fork in the blockchain 150 (e.g., two potential branches stemming from the main chain). The forked chain can be maintained by the nodes (or designated nodes) until a determination is made, by a consensus of the distributed ledger network 100, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative blockchain 150.

As discussed throughout, the blockchain 150 (and/or distributed ledger 150) may store blocks and/or records that include at least a fingerprint (e.g., a cryptographic hash) for each state of the document. The fingerprint may be sensitive to, and thus indicative of, any edits and/or alterations to the document. For example, a hashing algorithm that is prone to avalanche effects may be employed to generate the fingerprint. In some embodiments, an algorithm, such as but not limited to a p-hash algorithm, may be employed, where the avalanche effects of the algorithm is not sensitive to certain types and/or classes of edits, but avalanches when other types of edits are applied to the document. The blockchain 150 may store any of the information included in the various embodiments of the enhanced document file format discussed herein, including but not limited to the edit history of the document.

The blockchain 150 may also store blocks or records relating to transfers of digital tokens or monetary value. In this regard, a record can include any type of electronic record, including but not limited to one or more transactions, smart contracts, electronic documents, images or other digital media, URIs, alphanumeric text, unique identifiers, I.P. addresses, timestamps, hashes of any of the foregoing, or references to any of the foregoing. Any of the foregoing examples can be viewed as being the subject of a transaction, or can be indirectly associated with a transaction. For instance, ownership of an asset stored in a medium other than the blockchain 150 (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

Exemplary Embodiment of a Document Provenance System

Figure 2:
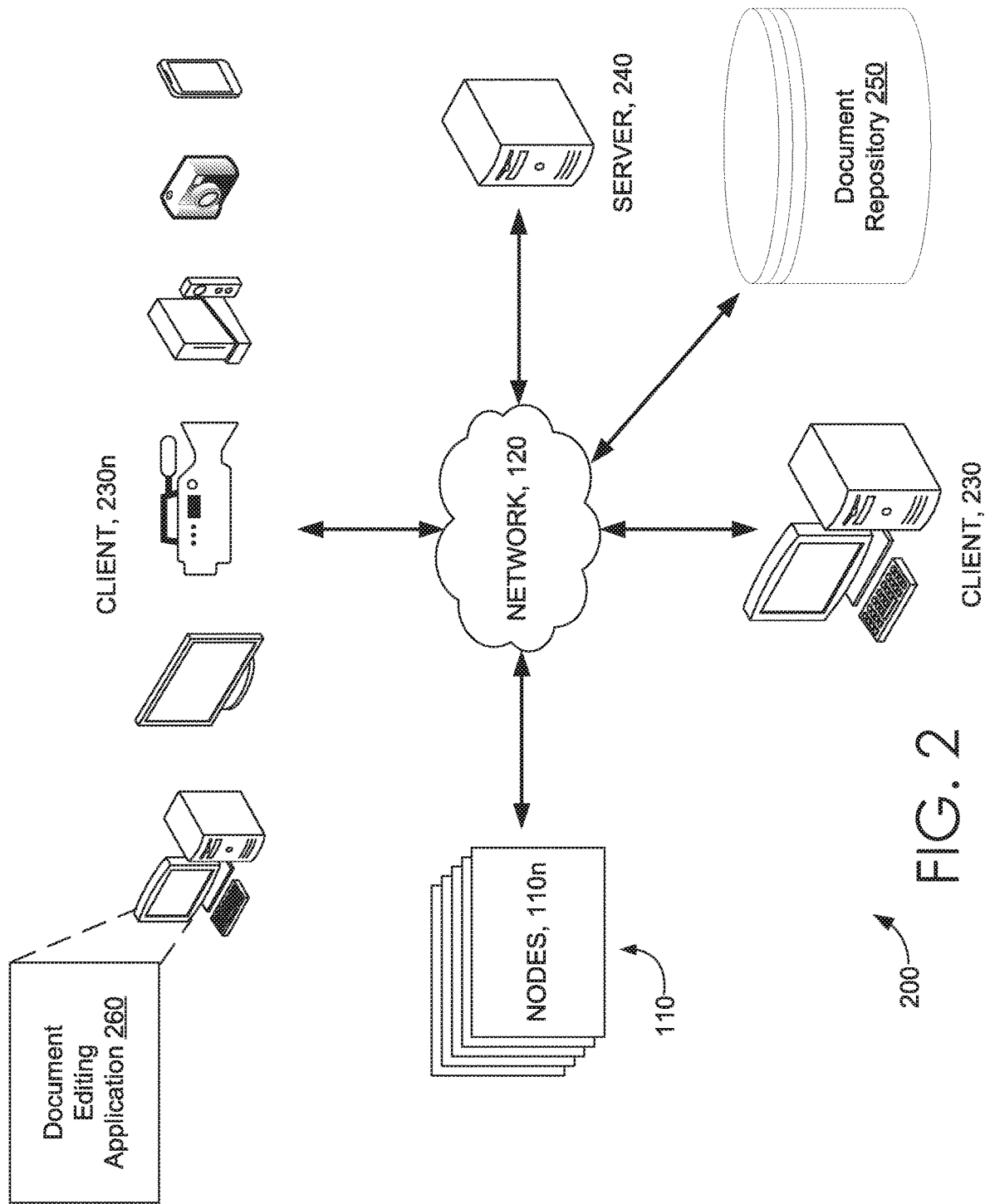
FIG. 2 is a schematic depiction is provided illustrating an exemplary document provenance system in which some embodiments of the present invention may be employed.

Referring now to FIG. 2, a schematic depiction is provided illustrating an exemplary document provenance system 200 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 can include, among other things, a distributed ledger network comprising a plurality of nodes 110n as described with reference to FIG. 1, each in direct or indirect communication with one another via a network 120. It is contemplated that the nodes 110n can include a subset of designated nodes authorized to perform specifically-designated operations, such as validation, verification, or block generation, among other things. The system can also include one or more client devices, such as client 230, 230n. It is contemplated that any one or more nodes 110n can be a client 230, 230n, and one or more clients, 230, 230n can be a node in accordance with embodiments described herein. In this regard, nodes 110n and clients 230, 230n are computing devices also described herein in accordance with FIG. 8.

In one aspect, a client 230, 230n and can include the consensus module similarly included in other nodes 110n (or designated nodes) within the distributed ledger network 100. In another aspect, the client 230, 230n can generate transactions that can initially be validated locally, via the consensus module included therein, before the transaction is passed on to other nodes. In another aspect, a client 230, 230n can be in communication with one or more nodes 110n via the network 120, and can locally generate a transaction for communication via the network 120 to one or more nodes 110n that the client 230, 230n is in communication with. In this way, the one or more nodes 110n (or designated nodes) receiving the transaction directly or indirectly from the client 230, 230n can validate the transaction in accordance with the present disclosure.

In various embodiments, at least one of clients 230, 230n may run, execute, and/or otherwise implement an enhanced document editing application, such as but not limited to document editing application 260. Various embodiments of document editing application 260 are discussed at least in conjunction with FIG. 3. However, briefly here, in addition to enable a user to edit a document, such as but not limited to a digital image, enhanced document editing application 260 is enabled to generate information and include the information in a document file that is encoded in an enhanced document file format. Various embodiments of the enhanced document file format are discussed in conjunction with FIG. 4. The enhanced document editing application 260 may be enabled to operate as at least one node of nodes 110n. Document editing application may store at least portions of the ledger, generate blocks to add to the ledger, partake in a distributed consensus operation required when adding blocks to the distributed ledger, verify/validate the content of the blocks of the ledger, and the like. A node component of an enhanced document editing application 260, may serve as at least a node of nodes 110n.

In some aspects, any node 110n can operate as a node that includes the consensus module, and any client 230, 230n can operate as a client device that can: transmit communications to one or more nodes 110n, generate transactions, and receive communications (e.g., transaction status, blockchain data) from one or more nodes 110n. For purposes of simplicity, the following description will reference a client 230, 230n as a node 110n, though embodiments are not limited as such.

In some embodiments, the system 200 can further include a server device, such as server 240. The server 240 can be in communication with one or more nodes 110n to send generated transactions to the one or more nodes 110n, request and receive transaction status information from the one or more nodes 110n, and/or request and receive blockchain data from the one or more nodes 110n, among other things. In some further embodiments, server 240 can include can include one or more computing devices, also described in accordance with FIG. 8, whereby the one or more computing devices include a consensus module to operate as a node 110n (or designated node). Among other things, the server 240 can further provide one or more services, such as data storage services, web hosting services for one or more websites, user authentication services, certificate authentication services, backup services, data mining services, "cloud"-stored data or web search services, block explorer services, and the like, including any combination thereof.

Figure 3:
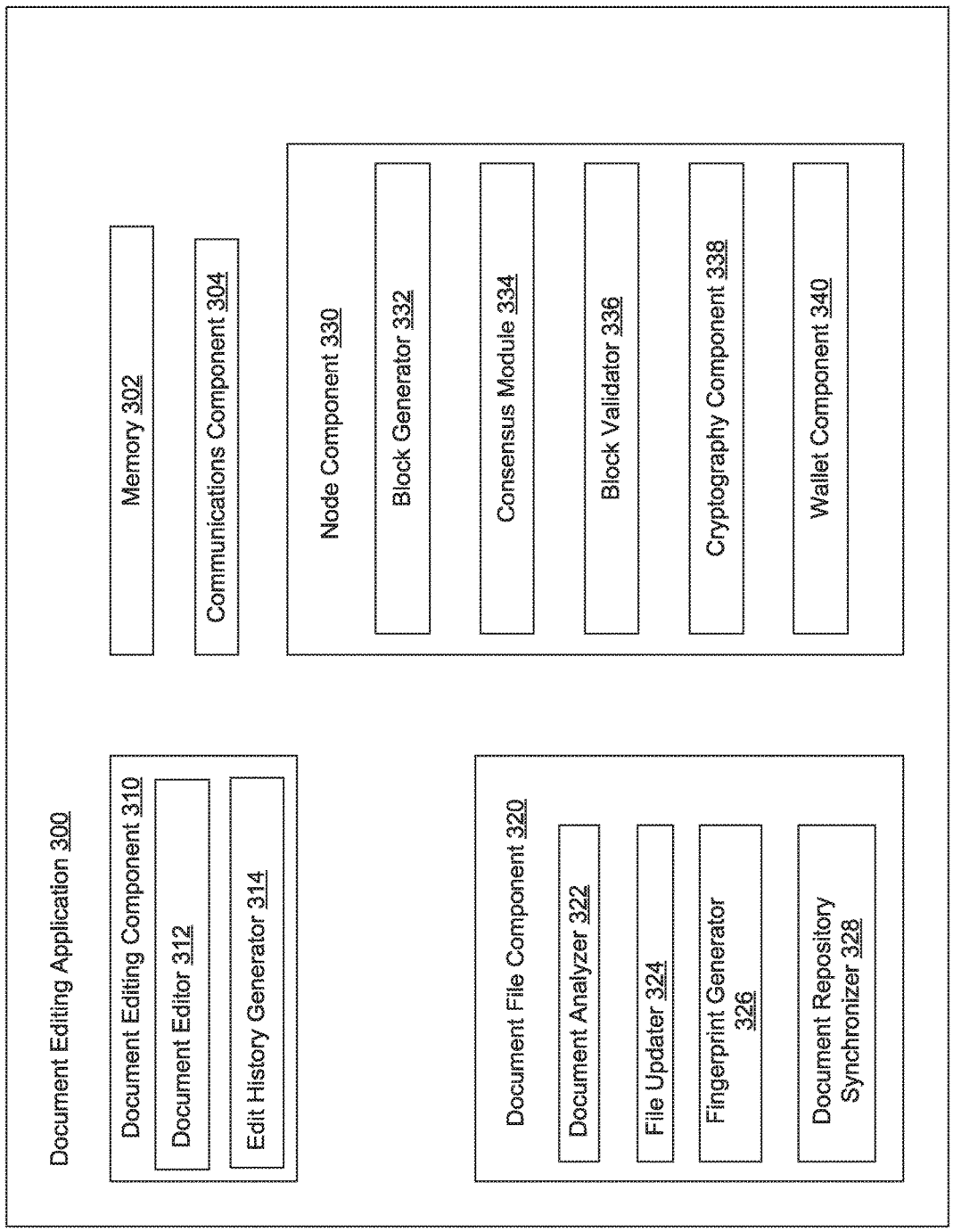
FIG. 3 is a block diagram depicting an exemplary document editing application in accordance with some embodiments of the present invention.

System 200 may additional include a document repository 250. Any of document editing application 260 may be enabled to store, retrieve, and/or recall documents in the document repository 250. In various embodiments, for each state of a document, a copy of the document may be stored in the document repository 250. In each block added to the ledger, a reference link to the corresponding copy of the document in the document repository may be included. Thus, each state of the document may be recalled and/or retrieved via the reference link (to the repository copy of the document) included in the corresponding block. To verify the integrity of the repository copy of the document, a state fingerprint of the retrieved copy of the repository copy may be generated (via the same avalanche effect-prone algorithm that initially generated the state's fingerprint) and compared to the state fingerprint stored in the corresponding block. Thus, the integrity of copies for each state of the document stored in the document repository 250 are reliable, immutable, and non-corruptible. The document repository 250 may be a cloud-based document repository. The document repository may be a document managing system, where documents may be "checked in" and "checked out" by users based on user permissions Exemplary Embodiments of a Document Editing Application and a Document File Format FIG. 3 provides a block diagram 300 that depicts an exemplary document editing application 300. Document editing application 300 may be an enhanced document editing application, and may be at least similar to document editing application 260 of FIG. 3. Document editing application 300 may be enabled to generate, read, write, edit, alter, save, and other operations involving an enhanced document file format, such as but not limited to image file format 400 of FIG. 4.

Document editing application 300 may include one or more of memory 302, communications component 304, document editing component 312, document file component 320, and node component 330. The memory 302 can include any type of transitory or non-transitory memory, such as a hardware storage device, random access memory (RAM), a cache, read-only memory (ROM), and the like, including any combination thereof. The memory 302 can be employed to store executable computer code that, when executed by one or more processors of the client devices 230, 230n of FIG. 2, perform operations defined and/or implemented within the document editing application 300 described herein. The memory 302 can also be employed to store data communicated from other nodes 110n, clients 230, 230n and/or servers 240, such as those described in accordance with FIG. 2. The communicated data stored in memory can include, among other things, digital documents, transactions involving digital documents, one or more blocks of a blockchain, determinations of validity, determinations of authentication/verification, unique identifiers and/or IP addresses of one or more nodes 110n, and other types of electronic data not limited to the foregoing.

The communications component 304 can include any type of communications device that enables the node 110n to communicate with other nodes 110n, clients 230, 230n and/or servers 240, such as those described in accordance with FIG. 2. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

Document editing application 300 may further include a document editing component, document file component 320, and a node component 330. Document editing component is generally responsible for enabling the editing of the contents of a document, such as but not limited an image stored via image file format 400, and generating an edit history for the document based on the edits and/or alterations of the document's contents. Document file component 320 is generally responsible for analyzing a document (e.g., semantically segmenting an image based on the various subjects depicted in the image), detecting a transition from a previous state to a current state, in response to detecting the transitions of states of the document, generating a fingerprint of the current state, and storing and/or retrieving documents stored in a document repository, such as but not limited to document repository 250 of FIG. 2. Node component 330 is generally responsible for enabling all the operations and functionalities of nodes 100, 110n of FIGS. 1-2.

In some embodiments, document editing application 300 may not include node component 330, or may include only a sub-portion of the modules, components, and/or functionalities of node component. In these embodiments, at least some of the capabilities, functionalities, responsibilities, and/or operations of the node component 330 may be offloaded to nodes of the ledger, such as but not limited to any of one or more nodes 110, 110n of FIGS. 1-2. In at least one embodiment, document editing application 300 may include cryptography component 338 and wallet component 340, while not including the other components or modules of node component 330. In such an embodiment, the various functionalities, responsibilities, and/or operations of the cryptography component 228 and the wallet component 330 may be carried out via document editing application 300, while other node operations are performed via other nodes of the distributed ledger. For example, document editing application 300 may generate a transaction (e.g., detect a state transition of a document). Document editing application 300 may package and send the transition to nodes, such that the transaction may be added to the ledger.

As noted throughout, in some embodiments, multiple transactions (e.g., multiple state changes of a document detected via one or more instances of document editing application 300) may be packaged into a single block to be added to the ledger. In such embodiments, each instance of a plurality of instances of document editing application 300 sends one or more transactions to at least one node of the ledger. The multiple transaction may be packed into one or more blocks. The one or more blocks may be added to the ledger via a distributed consensus performed via the ledger network.

In at least one such embodiment, document editing application 300 detects a state change of the document and generates a transaction corresponding to the state change. The transaction (or at least data indicating the transaction) may be sent to a node of the ledger. The node that receives the transaction (or transaction data) may provide the transaction to one or more other nodes. As discussed throughout, the nodes may be arranged in a peer-to-peer distributed network. The transaction may be received by at least a consensus of the nodes via the peer-to-peer network. The nodes may verify the transaction and generated a distributed consensus of the transaction and add the transaction to the ledger. In some embodiments, document editing application 300 may package the transaction (or transaction data) into a block. In other embodiments, a node of the ledger network may package the transaction into a block.

Figure 4:
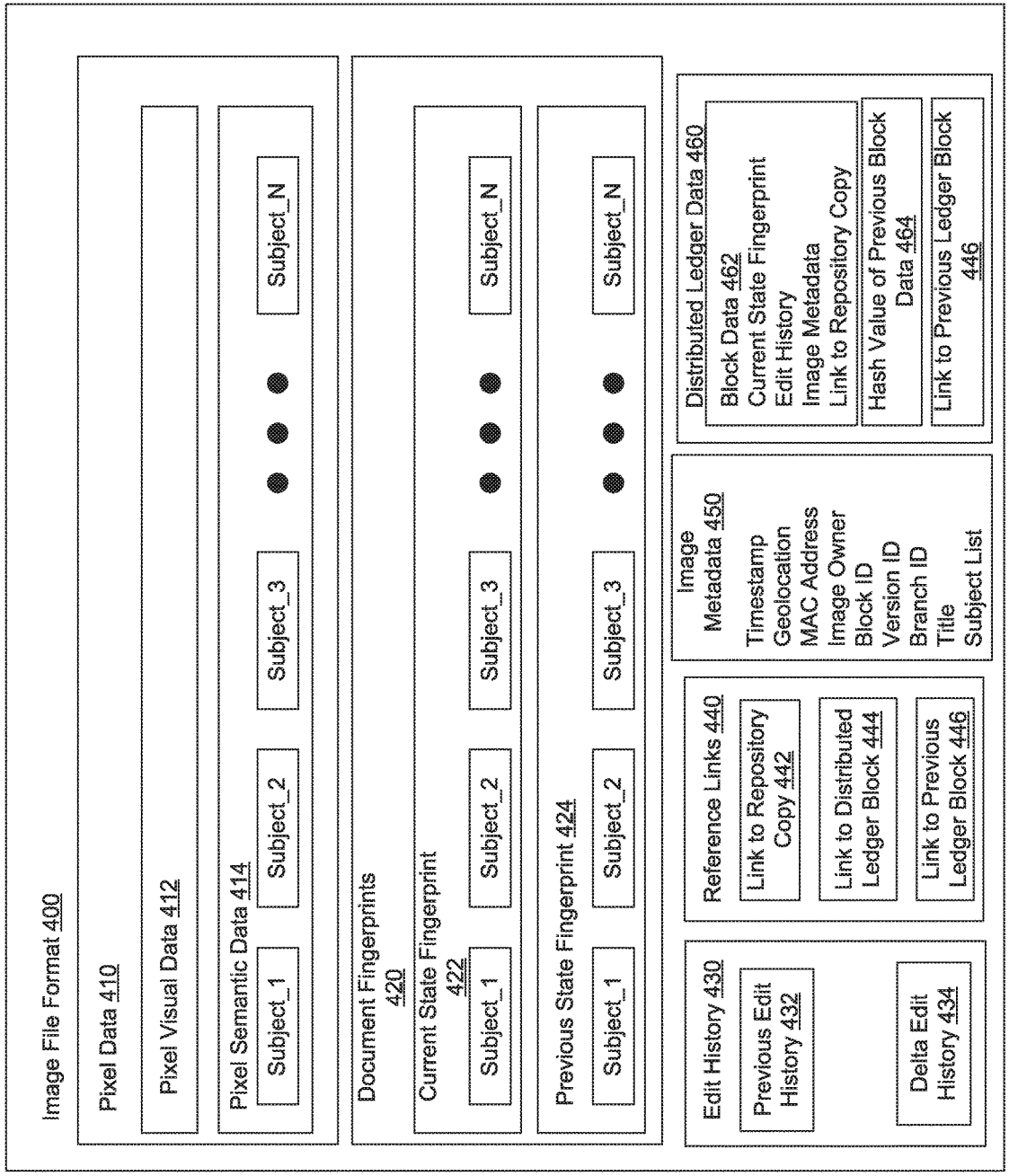
FIG. 4 provides a block diagram depicting an exemplary image file format in accordance with some embodiments of the present invention.

Various embodiments of document editing application will be described in the context of FIG. 4. FIG. 4 provides a block diagram 400 depicting an exemplary image file format 400. Image file format 400 may be an enhanced file format for storing and/or encoding image represented via image data, i.e., pixel data. Although image file format is directed towards storing an image, it should be understood how other enhanced document file formats, for other types of documents, may be similarly arranged. Generally, image file format may include structured and/or non-structured data, such as the document's content (i.e., pixel data 410), document fingerprints 420, the document's edit history 430, various reference links 440, image metadata 450, and distributed ledger data 460.

Pixel data 400 may encode the contents of an image. The image may include multiple subjects. In one embodiment, there may be N subjects (e.g., various individuals, various objects, foreground, background, and the like) depicted in the image, where N is a positive integer. The N subjects may be semantically labeled as subject_1, subject_2, subject_3, . . . , subject_N. The N subjects may be visually depicted via pixel values included in pixel visual data 412. The pixel visual data 412 includes pixel data that encodes visual features of the depicted subjects. In one non-limiting embodiment, the pixel values included in visual pixel data 412 may be encoded via RGB values.

The multiple subjects may be segmented via various methods. In at least some embodiments, document editing application 300 may be an image editing application and document editor 310 may include one or more tools and/or operations that enables a user to manually identify regions in an image that depicts various subjects. For example, a user may employ an "outlining" tool to manual outline one or more regions included in the image that depict one or more subjects. The outlines may be employed to generate one or more masks, to mask off the identified regions and/or subjects. In at least some embodiments, the segmenting of an image may be at least partially automated. For example, document editing component 310 may include a "magic wand" tool that enables a user to select a subject depicted in the image. Via various machine vision and/or other machine learning methods, the regions of the image that depicts the selected subjects may be automatically identified and masks for the identified regions may be automatically generated to determine the pixels associated with the depicted subjects. In at least one embodiment, the subjects and regions may be automatically identified via machine and/or computer vision. For example, as discussed below, a neural network, such as but not limited to a convolutional neural network (CNN) and/or an recurrent neural network (RNN) may be employed to automatically identify depicted subjects (e.g., object and/or facial recognition), and semantically segment the image into one or more regions depicting the automatically identified and/or detected subjects. Document analyzer 322 may include machine and/or computer vision capabilities that enable the at least partially automated identifying subjects and segmenting the image into one or more regions depicting the subjects.

As discussed throughout, the image may be semantically segmented, such that at least a portion of the pixels encoding the image may be labeled via a semantic label associated with the various depicted subjects. Pixel semantic data 414 may include the semantic labels for the pixels. That is, as shown in FIG. 4, via pixel semantic data 414, each pixel that is depicting subject_1 may grouped. Similarly, the pixels depicting the other subjects may be grouped via pixel semantic data 414.

Image file format 400 may include one or more document fingerprints 420. In some embodiments, image file format 440 may include a fingerprint for the image's current state, i.e., current state fingerprint 422. Image file format 440 may include the fingerprint of the image state, i.e., previous state fingerprint 424. In various embodiments, when a transition from a first state to a second state is detected and/or observed, the fingerprint encoded in current state fingerprint 422 is written into previous state fingerprint 424. The fingerprint of the current state is generated and written into current state fingerprint 422. In various embodiments, a fingerprint of the current state of the document may be generated by performing one or more cryptographic hash algorithms and/or cryptographic hash functions on at least a portion of the pixel data 412. In at least one embodiment, the fingerprint of a document may be the un-hashed pixel visual data.

In some embodiments, the fingerprint of the document may be generated via a tamper resistant image hash function, such as but not limited to a perceptual hash, or "p-hash" of the document's contents. A tamper resistant image hash function, such as a perceptual hash, may include a hashing algorithm or hash function that is relatively insensitive to certain types of edits or updates to particular features of a document, while being significantly sensitive to other types of edits or alterations to the features of the document. For example, in embodiments where the document is a digital image, a p-hash value of at least a portion of the image (e.g., a portion that includes a visualization of a subject, such as a model) may be generated. In some embodiments, the image may be semantically segmented to identify portions of the image associated with various subjects depicted in the image (e.g., a model and a background). Based on the semantic segmentation of the image, a p-hash algorithm may be employed to generate a p-hash value of the semantically identified portion of the image depicting the model. The p-hash value may be employed as the fingerprint of the image for the current state of the image.

The p-hash algorithm employed to generate the p-hash value of the portion of the image depicting the model may be relatively insensitive to certain classes or types of edits to the model, such as rotations or proportional re-scaling of the size and/or shape of the model. However, the p-hash algorithm may be significantly sensitive to other types of edits to the model, such as non-proportional re-scaling or the enhancement or decrease in the size or shape of portions of the model's figure. That is, the p-hash algorithm may include an avalanche effect for such types or classes of edits to be tracked. In various embodiments, a separate type of hash algorithm may be employed for each of the semantically segmented and/or otherwise identified portions of the image. For example, a first p-hash algorithm may be targeted towards portions of the image that depict human subjects, and a second p-hash algorithm (or any other type of fingerprint generator) may be targeted towards portions of the image that depict non-human subjects. That is, a fingerprint may be separately generated (and included in the distributed ledger) for each semantically segmented portion of the image. In this way, the embodiments may provide traceability for specific types of edits or alterations (e.g., manipulations of the shape of a subject depicted in the image) and for specific subjects depicted with the image, while not tracking other types of alterations and/or particular subjects (e.g., manipulations of the color of the background of the image). Both current state fingerprint 422 and previous state fingerprint 424 include p-hash values for each of the N depicted subjects.

Image file format 400 may also include an edit history 430 for the document. For example, for each edit applied to the contents of the document, the edit history may be updated to encode information regarding the edit. Edit history 430 may include an encoding of a list of specific edits to the document, e.g., a listing of specific edit operations performed on the image. For each edit in the edit history 430, the edit history 430 may indicate a specific user associated with edit, i.e., the edit history 430 may include a user attribution for each of the edits and/or alterations recorded and/or documented in the edit history. The user attributions may be tracked in composite works. In at least one embodiment, the edit history 430 may include at least a delta edit history 434. In some embodiments, the edit history includes both the delta edit history 434 and a previous edit history. The previous edit history 432 includes all the edits up until the previous state transition of the image. The delta edit history 434 may include all the edits to the image that occurred between the most previous state transition and the current state transition of the image.

Image file format 400 may also include various reference links 440. As used herein, a "reference link," a "reference," or simply a "link" may include any reference to a location of a resource, such as but not limited to a document, a document encoded in image file format 400, a record and/or a block in the ledger, or such. The reference may include an address, a pointer, a link, or any other such indication of a location of data within a system. Reference links 440 may include a link to a repository copy 442 of the image. As discussed throughout, a copy of a document may be stored in a document repository, such as but not limited to document repository 250 of FIG. 2. When the copy of the image is stored to the image repository, image file format 400 may be updated to include the link to the repository copy 442. In various embodiments, only the contents (i.e., pixel visual data 412) may be stored in the repository. In other embodiments, a larger portion of image file format is stored in the repository. In some embodiments, the entirety of the data encoded in image file format 400 may be stored in the image repository. In addition to the link to repository copy 442, some embodiments may also include a link to the repository copy of the image's previous state. It should be understood that in embodiments where only the delta edit history 434 is included in edit history 430, the entire edit history 430 may be reconstructed via following the links to the repository copy of the images previous state and concatenating and/or combining all of the delta edit histories of the previous states. Reference links 440 may include a link to the distributed ledger block 444 that corresponds to the current state of the image. Reference links 440 may include a link to the previous ledger block 446.

Image file format 400 may include various image metadata 540. Image metadata 450 may include virtually any information pertaining to the image, such as but not limited to a image capture timestamp, geolocation, a MAC address (or other identifier) of a camera device employed to capture the image, a user of the camera device and owner of the image, and the like. Metadata 450 may additionally include any other data, such as but not limited to a block ID of the corresponding block within the ledger, a document version ID, a branch ID that identifies the corresponding branch in the distributed ledger, a title of the image, a list of the N subjects depicted in the image, and the like. Virtually any information may be included in image metadata 450.

Image file format 400 includes distributed ledger data 460. As noted throughout, upon the transition to a new state of the image, information pertaining to the image is written into a block (or record) and the block is added to the distributed ledger. The data to write to the block is included in the distributed ledger data 460. In order to avoid inefficiencies of replicating data, block data 462 may include reference links to the corresponding data within image file format 400. Block data 462 may include virtually any of the data included in image file format 400, including but not limited to current state fingerprint 422, edit history 430, at least portions of image metadata 450, the link to the repository copy 442 of the image, and any other such information. In some embodiments, the delta edit history 434 is included in block data 462. As noted throughout, the entirety of the edit history 430 may be reconstructed via combing the delta edit histories for all the previous states. As indicated throughout, and consistent with blockchain-like distributed ledgers, the block corresponding to the current state of the image also includes a hash value of at least a portion of the previous block data 464. That is, hash value of previous block data 464 may include a hash value of at least a portion of the information included in block data 462 for the previous state of the image. As also consistent with blockchain-like distributed ledgers, the distributed ledger data 460 includes the link to the previous ledger block. When adding a new block to the distributed ledger, as least block data 462, hash value of previous block data 464, and link to previous ledger block 446 may be written to the block.

As indicated throughout, in some embodiments, a block in the ledger may include multiple transactions. A single block in the ledger may include the data (distributed ledger data 460) associated with multiple state changes of the document. That is, a single block may include a first instance of distributed ledger data 460 associated with a first state transition of the document, and a second a second instance of distributed ledger data 460 associated with a second state transition of the document. For example, multiple state transitions of a document (e.g., multiple edits and/or file operations) may occur within the period of time it takes to generate a distributed consensus and add a block to the ledger. In some embodiments, transactions (as documented via distributed ledger data 460) may include timestamps that indicate the date and time of the state transitions. The timestamps may be included in distributed ledger data 460. The multiple transactions (and links between the multiple transactions) may be temporally ordered within a single block, via the included timestamps.

Turning our attention back to FIG. 3, and in non-limiting embodiments, document editing application 300 may be an enhanced image editing application that is enabled to generate, read, write, edit, alter, save, and other operations involving image file format 400. The pixel visual data 412 of image file format 400 may be generated via a camera device.

Document editing component 310 may include a document editor 312 and an edit history generator 314. Document editor 312 is generally responsible for enabling the edits and/or alterations to the contents of a document. For example, document editor 312 generally enables a user to apply various edits and/or alterations to the pixel visual data 412. A user may retouch a subject depicted in an image via removing various blemishes in the subject. Document editor 312 may enable a user to re-shape and/or re-size various features of a subject. In various embodiments, document editor 312 may enable various "deepfake" deep-learning methods to provide image editing capabilities. Based on the operation of document editor 312, and in some embodiments, a user employing document editor 312, edit history generator 314 generates edit history 430.

Document file component 320 is generally responsible for interacting with image file format 400. Document file component 320 may include a document analyzer 322, a file updater 324, a fingerprint generator 326, and a document repository synchronizer 328. Document analyzer 322 may be an image analyzer and include various machine and/or computer vision capabilities. At least some of the computer vision capabilities may be employed via artificial intelligence (AI) technologies, including machine learning. Some of the machine learning may include deep learned methods. For example, document analyzer 322 may be implemented, at least partially, via neural networks, such as but not limited to encoder/decoder convolutional neural networks (CNNs), long short-term memory (LSTM) neural networks, and the like. In at least one embodiments, document analyzer 322 employs various object-recognition methods to determine N subjects depicted in the image, and semantically segments the image into regions corresponding to the subjects. Thus, document analyzer 322 may generate pixel semantic data 414 from the pixel visual data 412.

File updater 324 is generally responsible for detecting a transition of states of the image (e.g., an edit operation, a file operation, or the like). Upon detection of such a state transition, filer updater 324 updates any of the data included in image file format 400 that is impacted via the state transitions, such as but not limited to pixel data 410, document fingerprints 420, edit history 430, reference links 440, image metadata 450, and distributed ledger data 460. Fingerprint generator 326 generates the signal of the current state of the image. In various embodiments, fingerprint generator 326 may employ a cryptographic hash function on at least a portion of the pixel data 414. In some embodiments, fingerprint generator 326 may employ a p-hash function on the various regions of pixel values depicting the various subjects. Fingerprint generator 326 may employ pixel semantic data 414 to determine which portions of the image to apply the various p-hash functions on. Document repository synchronizer 328 is generally responsible for saving, recalling, and/or retrieving copies of new states of the image to an image repository, such as but not limited to document repository 250 of FIG. 2. Document repository synchronizer 328 may save each iteration of image file format 400 to the image repository.

Node component 330 of document editing application 300, may provide at least one of nodes 110n for the distributed ledger. The node component 330 may run as a background process on whichever computing device is running document editing application 330. In other embodiments, the node component 330 may only run when the document editing application 300 is currently being employed via the user. Various incentives (e.g., a digital token) may be provided to the user, such that the user enables their machine resources to be employed as a node and allow the node component to access their machine's resources to perform activities related to the maintenance of the ledger, such as but not limited to storing at least portions of the ledger, generating blocks for the ledger, verifying/validating the contents of the blocks, and participating in the distributed consensus operations required to add block to the ledger.

The node component 330 can include any number of components or subcomponents that, together with the memory 302 and communications component 304, enable the node 110n to operate as a peer node (or a peer to other "designated" nodes) in a distributed ledger network, such as distributed ledger network 100 described in accordance with FIG. 1. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Node component 330 may include one or more of a block generator 332, consensus module 334, block validator 336, cryptography component 338, and wallet component 340. The block generator 332 is generally responsible for generator one or more blocks to the added to the ledger. Block generator 332 may generate a block based on the information included in the distributed ledger data 460 of image file format 400. Block generator may generate a block of information to be added to the distributed ledger when a transition in the image's state is detected.

Consensus module 334 is generally responsible for enabling a node to participate in the distributed consensus methods for adding a block, generated via block generator 332, to the distributed ledger. In at least one embodiment, consensus module 334 analyzes the information included in distributed ledger data 460, as well as other portions if image file format 400, to determine whether the information to be added to the ledger is accurate. For example, consensus module 334 may determine whether the current state fingerprint is reflective of the document's current state, whether the edit history accurately indicates the edits made to the document, and whether a user that initiated the state transition is authorized to have data added to the distributed ledger. Consensus module 334 may determine whether the transaction that initiated the state transaction is a valid transaction. As discussed throughout, prior to a block being added to the ledger, a consensus of nodes storing the ledger must agree that the transaction is a valid transaction. For transactions involving the transfer of ownership of a digital asset, such as ownership of the document or a digital token, consensus module 334 may determine the whether the parties have control of the digital asset, whether they have the resources to cover the transaction, and/or whether they have user permissions granting them the ability to transfer and/or receive the digital asset.

Block validator component 336 is generally responsible validating the information in the blocks of the ledger. For example, the integrity of the ledger may be periodically checked, at least partially, by block validator 336. Using the hash value of the previous block 464 and the link to previous block 446, block validator component 336 may validate and/or verify that the contents of the previous block have not been tampered with and/or edited. Wallet component 340 may manage the transferring and receiving of digital tokens employed in the various embodiments.

Cryptography component 338 may be used by validator 336, block generator 332, consensus module 334, and/or wallet component 340. Cryptography component 338 may be provide various cryptography services to a node of the distributed ledger. Cryptography component 338 may utilize asymmetric cryptography (aka public-private key cryptography) for digital authentication and/or verification of transactions. Cryptography component 338 may generate cryptographic hashes of data utilizing a common-to-all-nodes hashing algorithm (e.g., SHA256, Scrypt, etc.). In embodiments where the data included in the blocks is sensitive, cryptography component may can encrypt/decrypt data.

In the various embodiments, verification and/or validation of a transactions includes a determination, via a consensus of the nodes, that a reference to a previous state of the document is encoded in the ledger (either in the same block that the transaction will be included in or a previous block of the ledger). As such, a transaction generated via the detection of a transition of a document's state, will include a reference to the previous state of the document (either a reference to another portion of the same block or a reference to a previous block), as well as the fingerprint of the current state and edit history, and any other data to be tracked in the ledger. The reference may point to the previous state's encoded fingerprint, transaction ID, or the like. When a state transition is initiated via a user, the transaction is generated and may be sent to a node. As discussed throughout, at least one node in the ledger would receive the transaction and send along the transaction to other nodes in a ledger network. The node may send along the transaction to other nodes in the ledger network. Upon verification of the transaction via distributed consensus of the nodes, the transaction may be added to the ledger. As indicated throughout, a block in the ledger may store multiple transactions. In some embodiments, a digital signature (enabled via public/private key cryptographs) can be employed, such that only authorized users may add state changes of a document into the ledger.

In some embodiments, image file format 400 may maintain its own ledger of file edits. That is, a ledger is written into image file format that includes blocks encoding distributed ledger data 460 for each of the states of the document. The ledger that is encoded in image file format 400 may be a Blockchain-style ledger. When a new copy of image file format 400 is instantiated and/or the ownership of the file is transitioned, a new fork or branch in the internal ledger may be generated.

Generalized Processes for Tracking Edits to Digital Documents

Figure 5:
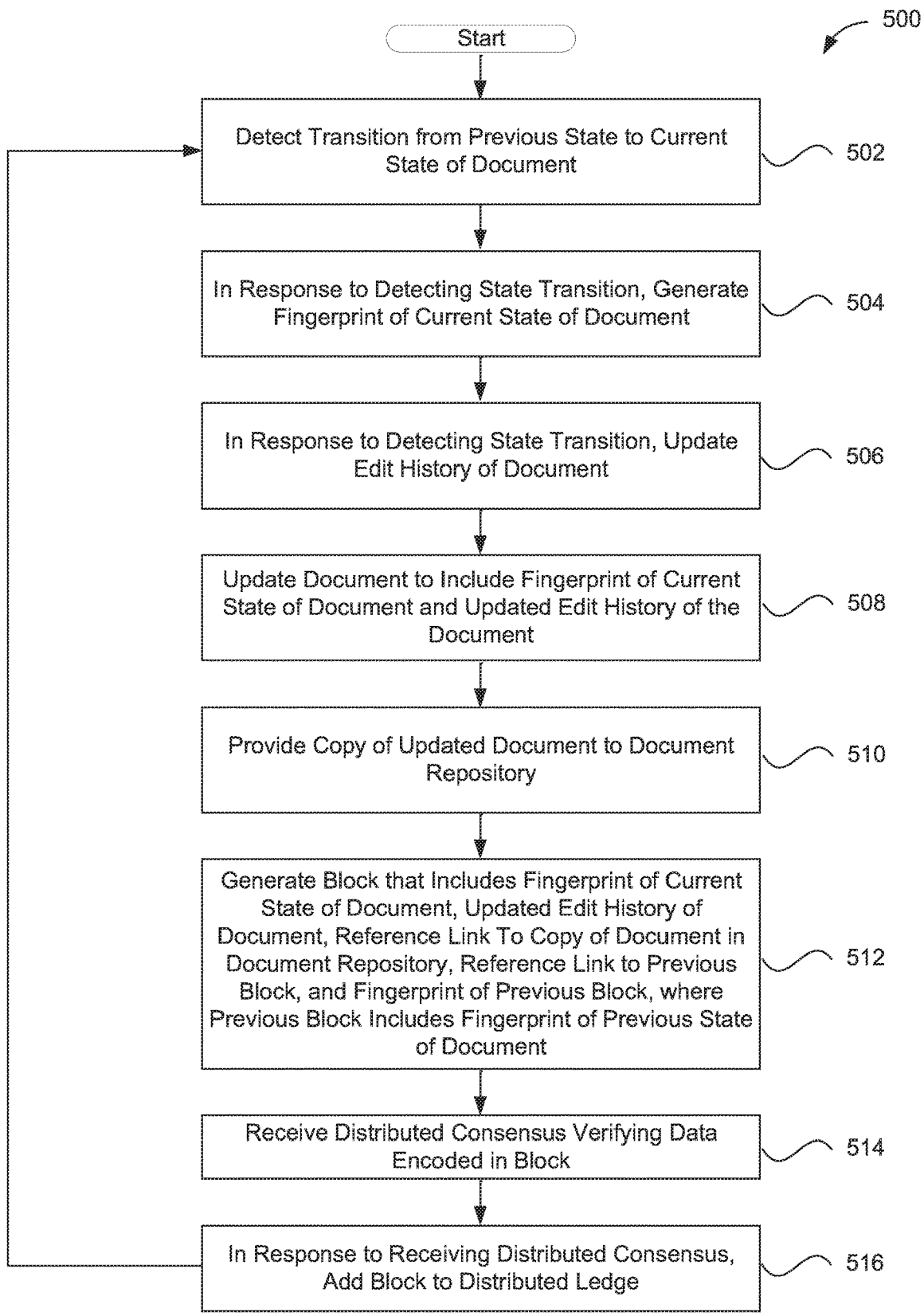
FIG. 5 illustrates one embodiment of an enhanced process flow for providing a provenance of a digital document in accordance with some embodiments of the present invention.
Figure 6:
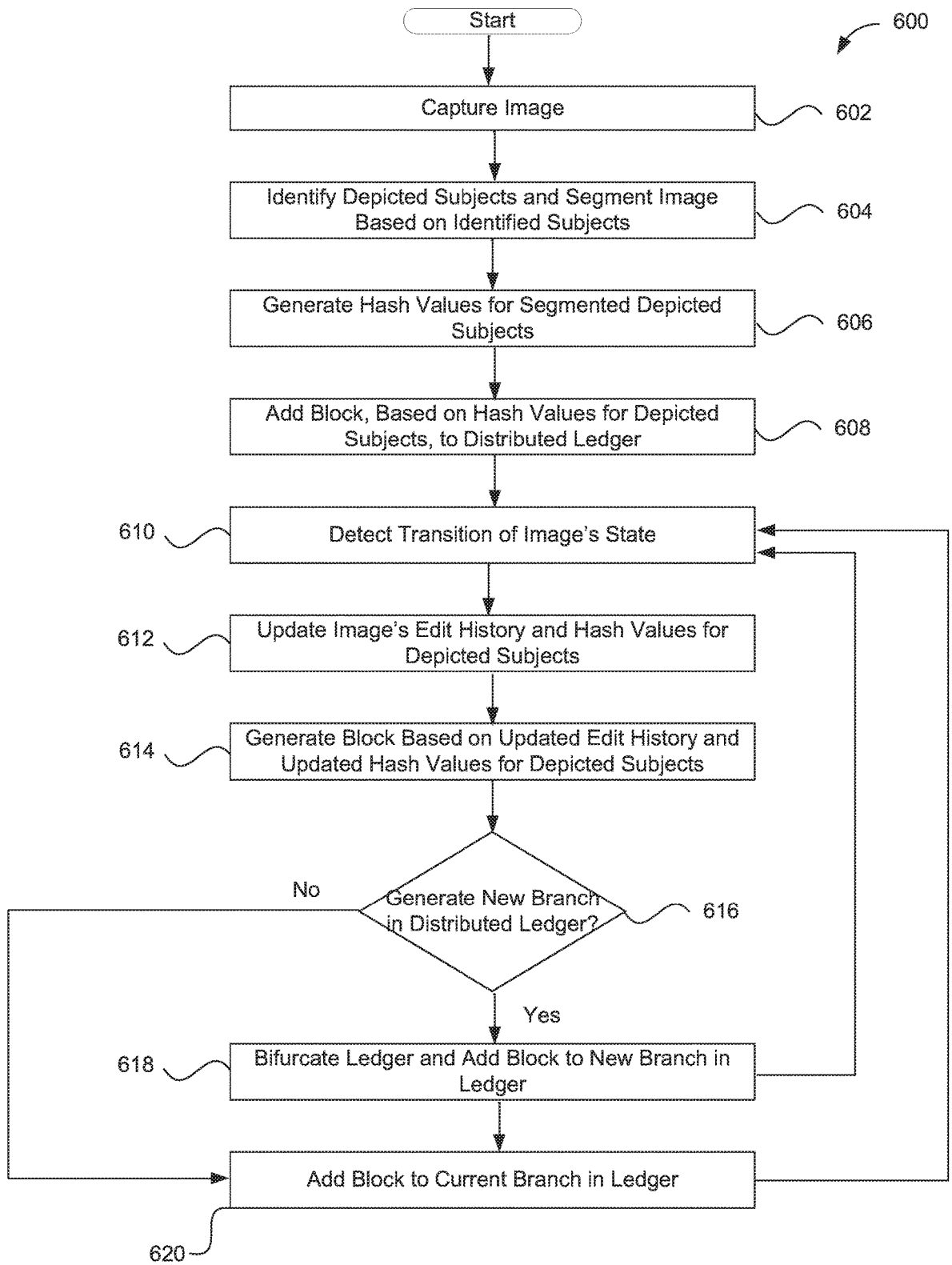
FIG. 6 illustrates one embodiment of an enhanced process flow for providing a provenance of an image in accordance with some embodiments of the present invention.
Figure 7:
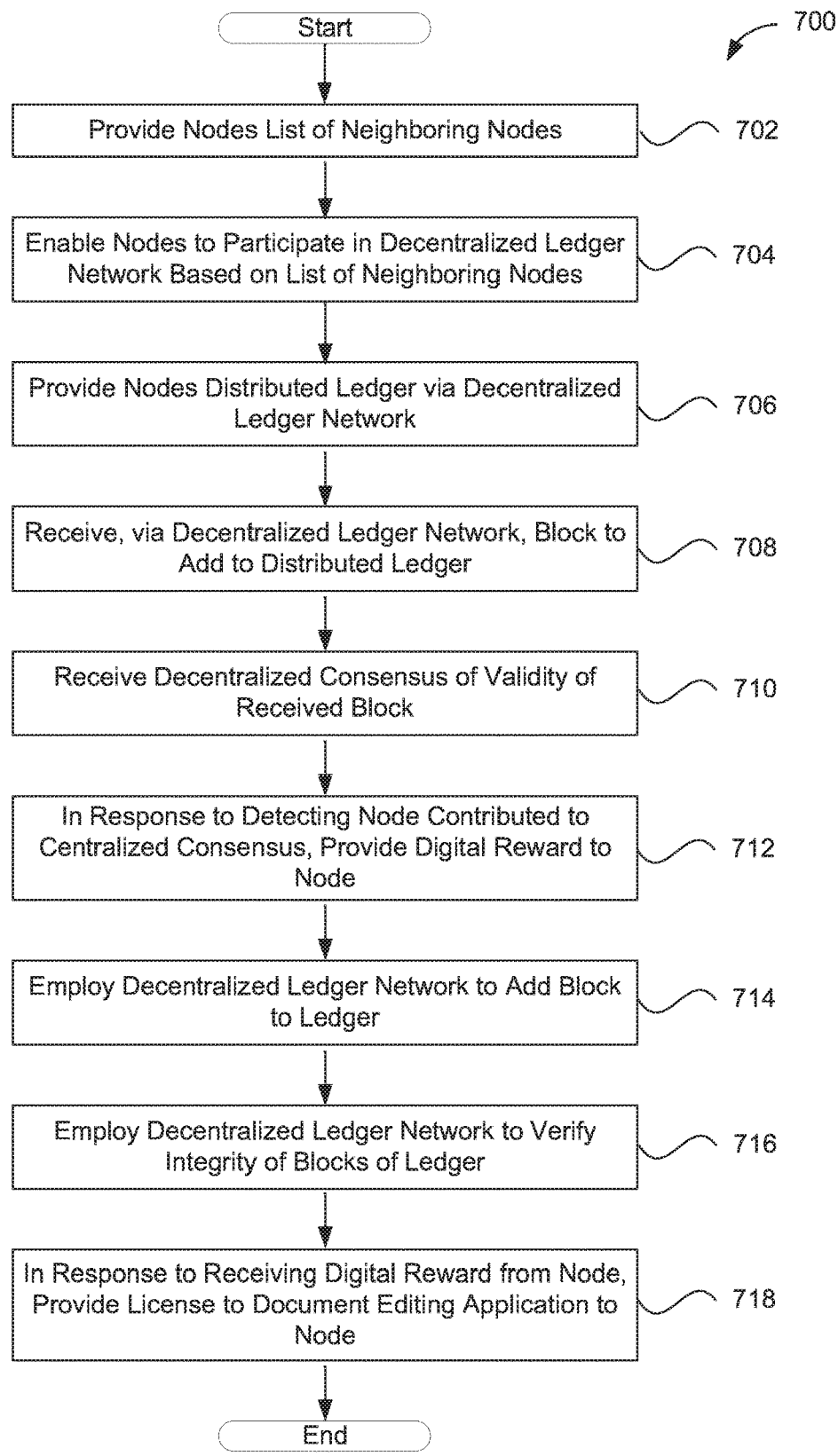
FIG. 7 illustrates one embodiment of an enhanced process flow for managing various operations associated with a distributed ledger in accordance with some embodiments of the present invention.
Figure 8:
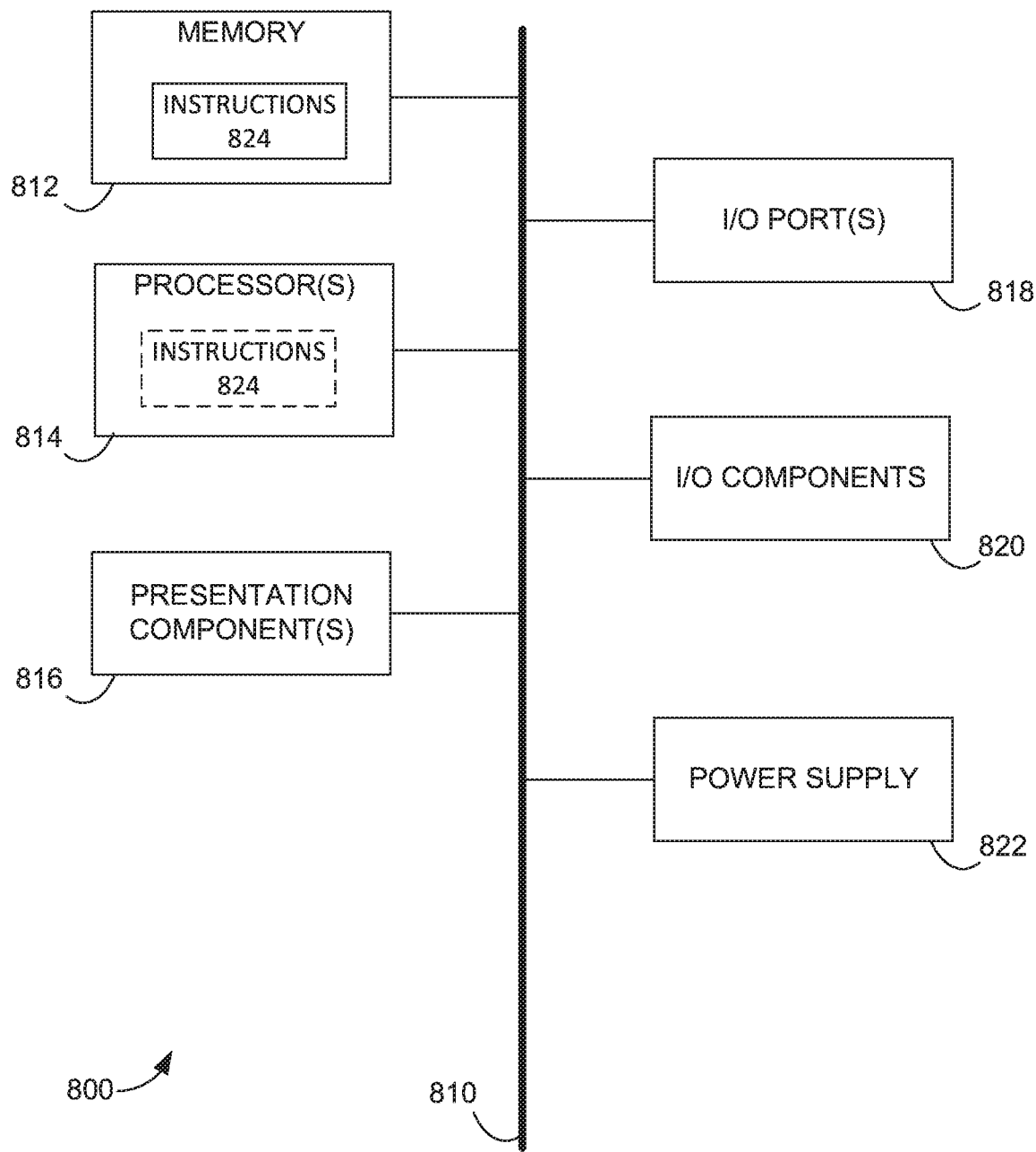
FIG. 8 is a block diagram of an exemplary computing environment suitable for use in implementing some embodiments of the present invention.

Processes 500-700 of FIGS. 5-7, or portions thereof, may be performed and/or executed by any computing device, such as but not limited to client devices 230, 230n and server 240 of FIG. 2, as well as computing device 800 of FIG. 8. Additionally, a node, such as but not limited to node 110, 110 of FIGS. 1-2 and/or node component 300 of FIG. 3 may perform and/or execute at least portions of processes 500-700. A document editing application, such as but not limited to document editing application 260 of FIG. 2 and/or document editing application 300 of FIG. 3 may perform and/or execute at least portions of processes 500-700.

The discussions of some of the various embodiments of processes 500-700 are directed towards providing traceability of an edit history (i.e., a provenance chain) of a digital document that is a digital image. However, it should be understood that the embodiments are not so limited, and various embodiments of processes 500-700 may also include providing traceability of an edit history of other types or classes of digital documents and assets, such as but not limited to audio/video recordings, records of transactions, and legal documents.

FIG. 5 illustrates one embodiment of an enhanced process flow for providing a provenance of a digital document, such as but not limited to an image. Process 500 begins, after a start block, at block 502, where a transition from a first state (e.g., a previous state) to a second state (e.g., a current state) of the document is detected. For example, file update 324 of FIG. 3 may detect a file operation and/or an edit to the document. At block 504, and in response to detecting the transition from the previous state of the document to the current state of the document, a fingerprint for current state of the document is generated. In at least one embodiment, fingerprint generator 326 of FIG. 3 may generate a current fingerprint of the document that corresponds to the current state of the document. For instance, when the document is an image, a cryptographic hash of at least a portion of the pixel data of an image may be generated. In at least one embodiment, the cryptographic hash may be a perceptual hash over regions of the image that depict one or more subjects.

At block 506, and also in response to detecting the state transition, an edit history of the document is updated. For example, file updater 324 may update edit history 430 of FIG. 4, where the updated edit history indicates one or more edits applied to the previous state of the document, such that the current state of the document includes the one or more edits. When the document is an image, the edits may include edits to the visual appearance (i.e., visual edits) of the image. At block 508, the document is updated to include at least the fingerprint of the current state of the document and the updated edit history of the document. In one embodiment, file updater 324 updates any of the data included in image file format 400 of FIG. 4 that is impacted via the document's state transition, such as but not limited to pixel data 410, document fingerprints 420, edit history 430, reference links 440, image metadata 450, and distributed ledger data 460. For example, structured data that encoded the document, via file format 400, may be updated to include the current fingerprint of the document, the updated history of the document, the reference link to a previous block, a previous fingerprints of the document that corresponds to the document's previous state, and the like.

At block 510, a copy of the updated document is provided to a document repository, such as but not limited to document repository 250 of FIG. 2. Document repository synchronizer 328 may provide the updated document to the document repository. The document repository may be an image repository. In such embodiments, the updated image, encoded via image file format 400 of FIG. 4 may be provided to the image repository. Once provided to the document repository, the copy of the updated document may be stored and/or archived at the document repository. A reference link to the stored copy may be received at block 510.

At block 512, a ledger block (or record) corresponding to the current state of the document is generated. In various embodiments, block generator 332 of FIG. 3 may generate the block. The block may include any data included in the updated document, e.g., any data included in image file format 400. In some embodiments, the block may include at least a portion of the data included in distributed ledger data 460 of FIG. 4. That is, the generated block may include at least one of the fingerprint of the current state of the document, the updated edit history of the document, and a reference link to the copy of the updated document stored in the document repository. The block may further include a reference link to a previous block in the distributed ledger, where the previous block corresponds to the previous state and may include at least a previous fingerprint of the document that corresponds to the previous state. The block may also include a fingerprint of the contents and/or information included in the previous block. For example, the generated block may include a fingerprint of the previous fingerprint of the document. The generated block may be provided to at least a portion of a plurality of nodes maintaining a blockchain-like distributed ledger. The plurality of nodes may validate and/or verify the data included in the provided block, and participate in a distributed consensus of the block as discussed throughout.

Thus in some embodiments, block 512 may include generating a transaction that indicates the fingerprint of the current state of the document, updated history of the document, a reference link to a copy of the document in a document repository, and the like. The transaction may be provided to nodes maintaining the ledger. The nodes may validated the contents of the transaction (via a distributed consensus) and package the validated transaction into a block to be added to the ledger.

In some embodiments, each state change of a document, generates a transaction. File updater 324 of FIG. 3 may generate a transaction corresponding to the state change of the document. As described above, the document editing application may provide the transaction to one or more nodes of a distributed ledger network for packaging the transaction into a block that is added to the ledger. As also indicated above, multiple transactions may in included in a single block within the ledger.

In various embodiments, and in response to a user request, the reference link to the copy of the document stored in the document repository may be accessed via the block. The accessed reference link may be employed, via document repository synchronizer 328, to retrieve and/or recall the stored copy of the document.

At block 514, a distributed consensus that verifies data encoded in the block may be received, as discussed in the various embodiments. For example, block validator 336 and/or consensus module 334 of various nodes of the distributed ledger may be employed to participate in the distributed consensus. At block 516, and in response to receiving the distributed consensus, the generated block (or record) is added to the distributed ledger, as discussed throughout. For example, a primary (or master) node of the nodes may provide a portion of the nodes a copy of the validated/verified block to add to their distributed copies of the ledger. In the various embodiments, the distributed ledger may be a blockchain. Process 500 may return to block 502 to await the detection of another state transition of the document.

FIG. 6 illustrates one embodiment of an enhanced process flow for providing a provenance of digital document or asset, such as but not limited to an image or a frame of video data. Process 600 begins, after a start block, at block 602, where an image is captured. In some embodiments, a camera may be employed to capture the image. At block 604, one or more subjects depicted in the image may be identified. Furthermore, the image may be segmented based on the identified subjects. In some embodiments, document analyzer 322 of FIG. 3 may analyze the image to identify various depicted subjects and semantically segment the image into regions depicting the individual identified subjects, via various machine and/or computer vision technologies (e.g., encoder/decoder convolutional neural networks). At block 606, a hash value for each of the identified and segmented subjects. Fingerprint generator 326 of FIG. 3 may be employed to generate the cryptographic hash values. In at least one embodiment, the cryptographic hash values may include a p-hash value, and a perceptual hash algorithm is used to generate p-hash values for each of the identified depicted subjects, based on the segmented regions depicting the subjects. The cryptographic hash values may be included in a fingerprint of the image.

At block 608, a block may be added to a distributed ledger. The block may be based on the hash values for the depicted subjects. For example, a fingerprint of the image may be generated, wherein the fingerprint includes at least a portion of the hash values for the depicted subjects. Various embodiments for adding a block to a distributed ledger are discussed in conjunction with at least process 600 of FIG. 6. In some embodiments, at least portions of one or more of block 604-608 may be performed via a camera computing device that captured the image. In other embodiments, the image may be offloaded to another computing device to perform at least some portions of blocks 604-608.

At block 610, a transition of the image's state may be detected. Various embodiments of detecting a transition of the image's state are discussed in conjunction with at least block 602 of process 600. However, briefly here, the image may be offloaded to a computing device that is running an image editing application, such as but not limited to document editing application 260 of FIG. 2 and/or document editing application 300 of FIG. 3. A user may be employing the image editing application to edit the image. A file updater included in the image editing application may detect a file operation and/or an edit to the image. At block 612, and in response to the detected transition, the image's edit history and hash values may be updated based on the image's current state. Various embodiments of updating the hash values and edit history of an image are discussed in conjunction with at least process 600. However, briefly here, a fingerprint of the image, corresponding to the image's current state may be updated to include updated hash values that reflect the image's current state. At block 614, a block (or record) is generated based on the updated edit history and updated hash values for the depicted subjects. Various embodiments of generating such a block are discussed in conjunction with at least block 612 of process 600.

At decision block 616, it is determined whether a new branch in the distributed ledger should be generated. For example, in the scenario where a first user copies the image and/or a copy of the image is provided to a second user, a new branch may be generated in the ledger. The new branch may be employed to track any edits in the new copy of the image, whereas the current branch is employed to track edits in the current copy of the image and/or edits associated with the second user. If the ledger is to be bifurcated and/or forked with a new branch, process 600 proceeds to block 618. Otherwise, process 600 proceeds to block 620.

At block 618, the ledger is bifurcated and the block is added to the new branch in the ledger. Process 600 returns to block 610 to await a detection of another state transition of the image. At block 620, the block is added to the current branch of the ledger. Again, process 600 may return to block 610 to await the detection of another state transition of the image. Various embodiments of adding a block to a branch in a ledger are discussed in conjunction with at least above block 608 and throughout process 600. It should be understood that process 600 may be adapted to document types other than images, i.e., audio/video recordings, records of transactions, and legal agreements. Note that blocks 616 and 618 may be optional blocks. That is, in some embodiments, the ledger does not bifurcate, and only a single branch of edits and/or state transitions is tracked. As discussed throughout, an enhanced file format, such as but not limited to document file format 400 of FIG. 4 may include its own blockchain of file edits. For example, a textual document may encode (via the enhanced file format) a blockchain of edits is being created and stored within a non-visible portion (e.g., metadata) of the document itself. A first user may make edits to the document, and send a copy of the edited document to a second and a third user. The second user may make edits to the document. The edits of the second user are included in the internal blockchain of the copy of the second user, but may not be reflected in the internal blockchain for the copies of the first and third users. Similarly, the edits of the third user are included in the internal blockchain of the third user's copy, but are not included in the internal blockchains of the first and second users. These various "internal" blockchains (or updates thereto) may be periodically (e.g., upon save or edit) be uploaded onto a single ledger. Thus, a fork in different versions can occur, but the transactions sent to the nodes to reflect these changes should not fork the chain itself. Each new "version" should may include a reference to a prior "version."

In some embodiments, such as but not limited to embodiments where only one document being tracked and forked versions of the document are not tracked, only a unique document identifier (e.g., document number and/or file name) associated with the document is included the transaction. One state to a subsequent state may be tracked. Furthermore, the possibility that a state can be edited in different instances by different users (causing forks in document states—not the blockchain) can be tracked. Thus, the various state changes from a particular prior state may be tracked. Accordingly, in these embodiments, the transaction could include not only the fingerprint of the current state, but also a fingerprint of the previous state (or a transaction id of the previous state). In this way, the chain of state changes for a particular document (including forks) can be tracked.

In some embodiments of process 600, a transaction verification process may include a determination by the nodes that a reference to the previous state is included in the ledger. In other words, the transaction may include a reference to the previous state (whether it be a hash, transaction id, unique id, etc.) along with the current edits or however it is you describe, and an identifier for the current state. When a state transition is detected, a current state identifier may be locally generated to send along with the transaction (which may also include a reference to the previous state and the current edits). In some embodiments, the state identifiers and/or state references may include a hash of each document state. In some embodiments, a generated transaction would look like: Digital Signature [previous state hash|log of edits|current state hash]

A node may receive the transaction, send along to other nodes, and the nodes would then save the transaction as a record onto the distributed ledger based on a determination that the previous state hash exists on the blockchain. In an embodiment that includes a new document, then a previous state hash may include a 'null' indication. Such a verification may include verification of digital signatures. The digital signature may be employed to identify the author of a particular state change, or that in some embodiments, the digital signature may be employed in the verification process so that only authorized authors associated with a document can save state changes to the ledger. Each version of a document (or at least the first version) may include each authorized user's public key.

FIG. 7 illustrates one embodiment of an enhanced process flow for managing various operations associated with a distributed ledger. The distributed ledger may be a blockchain-like distributed ledger. In various embodiments, portions of process 700 may be enabled and/or performed by a primary node and/or one or more other (non-primary) nodes that includes a node component, such as but not limited to node component 330 of FIG. 3. In some embodiments, a primary node may be a primary node of the ledger network. Process 700 begins, after a start block, at block 702, where an image is a listing of neighboring nodes is provided to a plurality of nodes. For example, a primary node may provide a list to each of a plurality of computing devices running a document editing application, such as but not limited to document editing application 260 of FIG. 2 and/or document editing application 300 of FIG. 3. That is, computing devices running and/or implementing the document editing application may provide node services for the maintenance of the distributed ledger, via a node component included in the document editing application, such as but not limited to node component 330. The node component may run as a background process on the computing device, and thus the computing device may provide node services whenever the device is on. For example, the node component may be configured to run as a background process when the document editing application is currently unused. In other embodiments, the node component may only provide node services when the user is actively using the image editing application. Each of the nodes may store at least portions of the distributed ledger. The list provided to a particular node (e.g., particular computing device running the image editing application) may be specifically targeted to the particular computing device, and include a list of other neighboring nodes in their vicinity. In at least one embodiment, the primary node may be operated by an entity or a party that develops and/or publishes the document editing application.

As discussed throughout, in at least some embodiments, the computing device implementing the image editing application does not provide node services. In such embodiments, the image editing application may detect the state transition of the image. In response to detecting the state transition of the image, the image editing application may generate a transaction that includes and/or encodes at least a portion of the data included in distributed ledger data 460 of FIG. 4. The transaction may be provided to the non-primary nodes of the ledger network to be packaged into a block, and the block added to the ledger via a distributed consensus.

At block 704, the primary node may enable the plurality of nodes to participate in a decentralized ledger network that maintains the distributed ledger. For example, the nodes may be enabled, via the node component and the provided lists of neighboring nodes, to self-organize into a peer-to-peer decentralized ledger network. Because the peer-to-peer network is decentralized, the peer-to-peer network may be a distributed ledger network. At block 706, via the decentralized ledger network, the primary node may provide at least a portion of the distributed ledger to one or more of the plurality of nodes. The plurality of nodes may store and maintain various portions of the distributed ledger, via the functionalities of their node component.

At block 708, a block (or record) may be received, via the peer-to-peer network, to add to the distributed ledger. In some embodiments, the block may be received via the primary node. The primary node may provide the other nodes the block. In other embodiments, the nodes distribute the received block to their nearest neighbors within the peer-to-peer network. The received block may be similar to the various embodiments of blocks generated in processes 600 or 600. As discussed throughout, in at least one embodiment, the block may include a fingerprint and/or a cryptographic hash of the contents of a document. At block 710, a decentralized consensus, performed by the nodes, of the validity of the received block, may be received via the peer-to-peer network. For example, the primary node may receive the distributed consensus. A decentralized consensus via the nodes is described throughout. However, briefly here, each of the blocks contributing to and/or participating in the distributed consensus may employ a consensus module, such as but not limited to consensus module 334 of FIG. 3, to perform operations required for the determining of the validity of the block. At block 712, and in response to detecting that a particular node contributed to and/or participated in distributed consensus, regarding the validity of the block, the primary node may encode a transfer of a digital reward (e.g., a digital token of economic value) to the particular node. As discussed throughout, a cryptography component and a wallet component, such as but not limited to cryptography component 338 and wallet component 340 may be employed to transfer the digital token to the particular node.

At block 714, and in response to receiving the distributed consensus, the peer-to-peer network may be employed to store and/or add the block to the distributed ledger. In one embodiment, the primary node coordinates the adding of the validated block to the ledger. At block 716, the peer-to-peer network is employed to verify the integrity of various blocks included in the distributed ledger. For example, one or more nodes may request an audit on the integrity of the data encoded in one or more blocks included in the ledger. As discussed throughout, the, a node may employ a block validator and a cryptography, such but not limited to block validator 336 and cryptography component 338 of FIG. 3, may provide functionalities required to verify the integrity of one or more blocks. For example, the links to previous blocks, as well as the fingerprint of the content of the previous blocks may be employed. At block 718, and in response to receiving a digital award from a node, the primary node may provide at least a temporary license and/or a copy of an application and/or tool, such as but not limited a document editing application.

Additional Embodiments for Tracking Edits to a Digital Document

Additional and/or alternative embodiments for tracking edits to a digital document and/or digital asset will now be described. These embodiments are consistent with the various embodiments described herein. As such, the document may be, but is not limited to, an image, audio/video recording, textual-based documents, spreadsheet documents, slide-deck documents, software source code, various records of economic and/or legal transactions, as well as various works of scholarship, art, and/or entertainment encoded in digital documents. In some embodiments, a method includes, in response to detecting a transition from a previous state of an image to a current state of a document, a current fingerprint of the image, which corresponds to the current state of the document, is generated. The document may be, but is not limited to, an image. A transaction may be generated. The generated transaction may include and/or encode the generated current fingerprint. The transaction may also include a unique identifier of the document. The unique identifier may include a document identification number, file name, file path, file address, or a reference or link to the document. The transaction may be signed via a private key of the computing device. The transaction may be communication to a plurality of nodes that collectively maintains a distributed ledger. The signed transaction may be communicated to at least one of the nodes such that the plurality of nodes may store the transaction in a current block of the distributed ledger.

That is, the current block may be added to a distributed blockchain-like ledger. The current block may include at least one of the current fingerprint of the image, a reference to a previous block included in the distributed ledger, or a fingerprint of the previous block. The previous block may encode a previous transaction that includes a previous fingerprint of the image that corresponds to the previous state of the image.

In some embodiments, the methods includes generating (or at least causing the generating of) an updated edit history of the image. The updated edit history indicates visual edits applied to the previous state of the image. The current state of the image includes the one or more visual edits. The transaction encoded in the current block may include the updated edit history of the image. The previous block may encode a previous transaction that includes a previous edit history of the image.

A copy of the image may be stored in an image repository. The copy of the image is in the current state. The current block may include a reference to the stored copy of the image. In response to a user request, the reference to the stored copy of the image may be accessed. In response to detecting the transition from the previous state of the image to the current state of the image, structured data that encodes the image may be updated to include the current fingerprint of the image, an updated edit history of the image, the reference to the previous block, the previous fingerprint of the image, and a reference to a repository copy of the image. The repository copy of the image may be in the current state.

The previous block may be included in a first branch of the distributed ledger that tracks image edits associated with a first user. In response to determining that a second user has been provided a copy of the image, the current block may be added to a second branch in the distributed ledger. The second branch may track image edits associated with the second user. Generating the current fingerprint of the image may include generating a cryptographic hash value of at least a portion of the image. In one embodiment, a subject (e.g., an object) is detected in the image. A perceptual hashing algorithm is employed to determine a perceptual hash value of a region of the image that depicts the subject. The perceptual hash value may include and/or may be the current fingerprint of the image.

In another embodiment, a document is generated. For example, an image may be captured via a camera. A first cryptographic hash value of at least a portion of the document is stored in a distributed ledger that is at least similar to a blockchain. The camera may at least generate the first cryptographic hash. A state transition of the document is detected. In response to detecting the state transition of the document, a second cryptographic hash of the document is generated. The second cryptographic hash of the document is stored in the blockchain. In response to detecting the state transition of the document, an edit history of the document is generated and/or updated. The edit history of the document is stored in the blockchain. A copy of the document may be stored in a document repository. A reference link to the copy of the document may be stored in the blockchain. The reference link stored in the blockchain may be employed to provide the copy of the document to a user.

Metadata associated with the document may be stored in the blockchain. A file format for the document may store the metadata and a fingerprint for the document. The fingerprint may include at least one of the first and/or the second cryptographic hash of the document. In response to detecting a distribution of the document to one or more users, a bifurcation or fork in the blockchain may be generated. Regions in the image that depict one or more subjects may be identified and/or detected. A perceptual hash value of each of the identified regions in the image is generated. The first cryptographic hash value includes the perceptual hash value for each of the identified regions in the image. The perceptual hash value for each of the identified regions is a fingerprint for the corresponding subject depicted in the region.

In another embodiment, in response to detecting an operation on a document file, a fingerprint of the document is generated. In some embodiments, the document may be an image and the document file may be an image file that includes image data encoding an image, wherein the image file includes image data encoding the image and the fingerprint is based on at least a portion of the image data. A record (or block) that includes the fingerprint (e.g., a cryptographic hash value) of the image is generated. The record is provided to a plurality of nodes of a distributed ledger. The distributed ledger may include a plurality of other records and may be a blockchain. A consensus of a validity of the record is received from at least a portion of the plurality of nodes. In response to receiving the consensus of the validity of the record, the record is added to and/or stored in a distributed ledger. The added record includes a first reference link to a first record of the plurality of other records and a first hash value based on the first record. The added record may further include an updated edit history of the image. The first record may include a previous edit history of the image. The first hash value may be further based on the previous edit history of the image.

In some embodiments, and in response to detecting an operation on an image file, a copy of the image file may be provided to an image repository. A second reference link may be in the added record. The second reference link may be a reference link to the copy of the image file. The first record includes a third reference link to a previous copy of the image that is stored in the image repository. The first hash value is further based on the third reference link. The second reference link may be accessed via the added record. The accessed second reference link is employed to retrieve the copy of the image file. Another fingerprint of the image that is based on the retrieved copy of the image file may be generated. An integrity of the retrieved copy of the image may be determined via a comparison between the fingerprint of the imaged included in the added record and the other fingerprint of the image.

In various embodiments, the image file is updated to include the fingerprint of the image, the first reference link to the first record, and the first hash value. The distributed ledger may include a bifurcated topology. The bifurcated topology may include a plurality of branches. Each of the plurality of branches may be associated with a separate version of the image. The fingerprint of the image may be further based on applying a perceptual hashing algorithm to a portion of the image data. The portion of the image data depicts a particular subject of a plurality of subjected depicted by an entirety of the image data.

In various embodiments directed towards maintaining a distributed ledger across a plurality of nodes, a primary node is employed to provide each of the plurality of nodes with a corresponding list of neighboring nodes of the plurality of nodes. The plurality of nodes are enabled to self-organize into a peer-to-peer network based on the provided lists of neighboring nodes. Via the peer-to-peer network, at least a portion of the distributed ledger is provided to each of the plurality of nodes. In response to receiving a consensus on a validity of a block from the plurality of nodes, the peer-to-peer network may be employed to store the block in the distributed ledger. The block may include a fingerprint of at least a portion of an image. Each of the plurality of nodes may be at least partially implemented by a node component. The node component may be included in an image editing application that is configured to edit the image. In some embodiments, the node component is configured to run as a background process when the image editing application is currently unused. In other embodiments, the node component is configured to run only when the image editing application is currently in use.

In some embodiments, and in response to detecting that a first node of the plurality of nodes contributed to the consensus on the validity of the block, a transfer of a digital token, from the primary node to the first node, may be encoded in the distributed ledger. In another embodiment and in response to receiving, from a first node of the plurality of nodes, a transfer of a digital token, the first node may be provided with a license to and/or a copy of an image editing application. The license may be a time-limited license or a perpetual license.

In still another embodiment, a method includes employing a service provider to retrieve a first block included in a distributed ledger. The first block includes a first fingerprint of the document that corresponds to a first state of the document. The service provider is employed to access a second fingerprint of the document that corresponds to a second state of the document. In some embodiments, accessing the second fingerprint may include generating the second fingerprint. In other embodiments, accessing the second fingerprint may include retrieving a second block in the distributed ledger that includes the second fingerprint and is associated with the second state of the document. The service provider is employed to generate a comparison between the first fingerprint of the document and the second fingerprint of the document. For example, the service provider may analyze each of the first and the second fingerprints. Based on the comparison, the service provider may identify a difference between the first fingerprint of the document and the second fingerprint of the document via the comparison. In response to identifying the difference, an indication that the second state of the document includes one or more edits that are not included in the first state of the document may be generated and provided to a user.

In some embodiments, the document is an image. The first fingerprint of the document may include a first perceptual hash (p-hash) value of at least a first portion of the image in the first state. The second fingerprint of the document includes a second p-hash value of the first portion of the image in the second state. The first and the second p-hash values may be p-hash values of a particular subject depicted in the image. The service provider may be implemented by a primary node of a ledger network that maintains the distributed ledger. In some embodiments, the service provider may be to generate the visualization of the distributed ledger. The visualization of the distributed ledger may be provided to a user.

In various embodiments, generating the comparison between the first fingerprint of the document and the second fingerprint of the document may include identifying one or more similarities between the first fingerprint of the document and the second fingerprint of the document via the comparison. In response to identifying the one or more similarities between the first fingerprint of the document and the second fingerprint of the document via the comparison, an indication that the second state of the document includes a copy of one or more portions of the first state of the document may be generated. In at least one embodiment, the service provider is employed to determine a first contribution to the document that is associated with a first user. The service provider is also employed to determine a second contribution to the document that is associated with the second user. The service provider is employed to an indication of the first and second contributions to the document.

Exemplary Embodiment of a Computing Device

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for, among other things, traceability of edits to and a provenance chain for digital documents and/or assets via a distributed ledger, such as but not limited to a blockchain-style ledger. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computing system for providing a provenance of a digital document, the comprising:
   a processor device; and
   a computer-readable storage medium, coupled with the processor device, having instructions stored thereon, which, when executed by the processor device, cause the system to perform actions comprising:
   in response to a detected transition from a previous state of the digital document to a current state of the digital document, generating a current fingerprint of the digital document that corresponds to the current state of the digital document;
   generating a transaction that includes the generated current fingerprint of the digital document and a generated previous fingerprint of the document, wherein the generated previous fingerprint corresponds to the previous state of the digital document and the current state of the digital document includes one or more edits applied to the previous state of the digital document; and
   communicating the generated transaction to a node of a plurality of nodes that collectively maintains a distributed ledger to store the transaction, wherein the distributed ledger is employable to determine the provenance of the digital document based at least in part on the transaction such that the one or more edits applied to the previous state of the digital document are detectable from an arbitrary location in the distributed ledger via a traversal of the distributed ledger.

2. The computing system of claim 1, wherein the generated transaction further includes an updated edit history that indicates the one or more edits applied to previous state of the digital document and a reference to a previously-generated transaction that includes a previous edit history that does not indicate the one or more edits applied to the previous state of the digital document, and the current fingerprint of the digital document is further based on the previous edit history of the digital document.

3. The computing system of claim 1, wherein the digital documents includes image data encoding an image and the actions further comprising:
   in response to the detected transition from the previous state to the current state, providing a copy of the digital document to an image repository;
   including a reference to the copy of the digital document in the generated transaction;
   accessing the reference via the generated transaction;
   employing the reference to retrieve the copy of the digital document;
   generating another fingerprint of the digital document based on the retrieved copy of the image file; and
   determining an integrity of the retrieved copy of the digital document based on a comparison between the current fingerprint of the digital document included in the generated transaction and the other fingerprint of the image.

4. The computing system of claim 1, the actions further comprising:
   updating the digital document to include the current fingerprint of the digital document and the previous fingerprint of the digital document.

5. The computing system of claim 1, wherein the distributed ledger includes a bifurcated topology that includes a plurality of branches and each of the plurality of branches is associated with a separate version of the digital document.

6. The computing system of claim 1, wherein the digital document includes image data, the current fingerprint of the digital document is further based on applying a tamper resistant image hashing algorithm to a portion of the image data that depicts a particular subject of a plurality of subjects depicted by an entirety of the image data.

7. A non-transitory computer-readable storage medium having instructions stored thereon for providing a provenance of a digital document, which, when executed by a processor of a computing device cause the computing device to perform actions comprising:
   in response to detecting a transition from a saved state of the digital document to a revised state of the digital document that includes one or more edits applied to the saved state of the digital document, generating a first fingerprint of the digital document that corresponds to the revised state of the digital document;
   generating a transaction that includes the generated first fingerprint of the digital document and a unique identifier that corresponds to a previously-generated transaction stored on a distributed ledger, wherein the previously-generated transaction includes a second fingerprint that corresponds to the saved state of the digital document and a third fingerprint that corresponds to a previously-saved state of the digital document; and
   communicating the generated transaction to a node of a plurality of nodes that collectively maintains the distributed ledger to store the generated transaction, wherein the distributed ledger is employable to determine the provenance of the digital document based at least in part on the generated transaction and the stored previously-generated transaction such that the one or more edits applied to the saved state of the digital document are detectable from an arbitrary location in the distributed ledger via a traversal of the distributed ledger.

8. The computer-readable storage medium of claim 7, the actions further comprising:

generating an updated edit history of the digital document that indicates the one or more edits applied to the saved state of the digital document, such that the revised state of the digital document includes the one or more edits, wherein the generated transaction includes the updated edit history of the digital document and the previously-generated transaction includes a previous edit history of the digital document that does not indicate the one or more edits applied to the saved state of the digital document.

9. The computer-readable storage medium of claim 7, the actions further comprising:

storing a copy of the digital document in a digital document repository, wherein the copy of the digital document is in the revised state;

including a reference to the stored copy of the digital document in the generated transaction;

in response to a user request, accessing the reference to the stored copy of the digital document; and employing the accessed reference to the stored copy of the digital document to retrieve the stored copy of the digital document.

10. The computer-readable storage medium of claim 7, wherein the actions further comprise:

in response to detecting the transition from the saved state of the digital document to the revised state of the digital document, updating structured data that encodes the digital document to include the current fingerprint of the digital document, an updated edit history of the digital document, the unique identifier that corresponds to the previously-generated transaction, the second fingerprint of the digital document, and a reference to a repository copy of the digital document, wherein the repository copy of the digital document is in the current state.

11. The one or more computer-readable storage media of claim 7, wherein the actions further comprise:

employing the node to generate a current block based on the generated transaction;

in response to receiving a distributed consensus from the plurality of nodes validating the current block, adding the current block to the distributed ledger.

12. The one or more computer-readable storage media of claim 7, wherein the digital document is an image and the actions further comprise:

identifying a subject depicted in the image;

employing a tamper resistant image hashing algorithm to determine a tamper resistant image hash value of a region of the image that depicts the subject; and including the tamper resistant image hash value in the first fingerprint of the image.

13. The one or more computer-readable storage media of claim 7, wherein generating the first fingerprint of the digital document includes generating a cryptographic hash value of at least a portion of the digital document.

14. A method for providing a provenance of a document, comprising:

steps for generating the document;

steps for storing a first cryptographic hash of the document in a blockchain;

steps for detecting a state transition from a first state of the document to a second state of the digital documents that includes one or more edits applied to the first state of the document; and steps for storing a second cryptographic hash of the document in the blockchain, wherein the second cryptographic hash of the document is generated in response to the detected state transition of the document and the one or more edits applied to the first state of the document are detectable from an arbitrary location in the block chain via a traversal of the blockchain.

15. The method for claim 14, further comprising:

steps for generating an edit history that indicates the one or more edits applied to the first state of the document; and steps for storing the edit history of the document in the blockchain.

16. The method of claim 14, further comprising:

steps for storing a copy of the document in a document repository;

steps for storing a reference link to the copy of the document in the blockchain; and steps for employing the reference link to provide the copy of the document to a user.

17. The method of claim 14, further comprising:

steps for storing metadata associated with the document in the blockchain, wherein a file format for the document stores the metadata and a fingerprint for the document that includes the second cryptographic hash of the document.

18. The method of claim 14, further comprising:

in response to detecting a distribution of the document to one or more users, steps for generating a bifurcation in the blockchain.

19. The method of claim 14, further comprising:

steps for identifying one or more regions in the image that depict one or more subjects; and steps for generating a tamper resistant image hash value of each of the one or more regions in the image, wherein the first cryptographic hash value includes the tamper resistant image hash value for each of the one or more regions in the image and the tamper resistant image hash value for each of the one or more regions is a fingerprint for the corresponding subject depicted in the region.

20. The method of claim 14, wherein the document is an image captured by a camera and the camera is employed to generate the first cryptographic hash of the image.

* * * * *